US005281993A

United States Patent [19]

Crochetierre et al.

[11] Patent Number: 5,281,993

[45] Date of Patent: * Jan. 25, 1994

[54] PHOTOFINISHING APPARATUS AND METHOD

[75] Inventors: Raymond H. Crochetierre, Southampton; Michael T. O'Leary, Springfield; John R. Reuss, Westfield; Walter R. Hadank, Springfield, all of Mass.

[73] Assignee: Gretag Imaging, Inc., Chicopee, Mass.

[ * ] Notice: The portion of the term of this patent subsequent to Mar. 3, 2009 has been disclaimed.

[21] Appl. No.: 845,376

[22] Filed: Mar. 3, 1992

Related U.S. Application Data

[63] Continuation of Ser. No. 537,294, Jun. 12, 1990, Pat. No. 5,093,684, which is a continuation-in-part of Ser. No. 279,463, Dec. 2, 1988, Pat. No. 4,933,711, which is a continuation-in-part of Ser. No. 18,097, Feb. 20, 1987, Pat. No. 4,821,061.

[51] Int. Cl.$^5$ ...................... G03B 17/24; G03B 27/32; G06F 15/20

[52] U.S. Cl. ........................................ 355/40; 355/77

[58] Field of Search .............................. 355/40, 41, 77

[56] References Cited

U.S. PATENT DOCUMENTS 4,779,122 10/1988 Signoretto ............................ 355/77

5,093,684 3/1992 Crocketierre et al. ............... 355/40

*Primary Examiner*—Richard A. Wintercorn

*Attorney, Agent, or Firm*—Lyon & Lyon

[57] ABSTRACT

An improved photofinishing packaging apparatus and related method is described in which a film bar code is read, and identification indicia which may be different from the film bar code is encoded onto the corresponding prints generated from the film. The film bar code is then paired with the identification indicia, which pairing is stored in a computer. Later, the packager uses the pairing to match up the film with the corresponding prints.

17 Claims, 17 Drawing Sheets

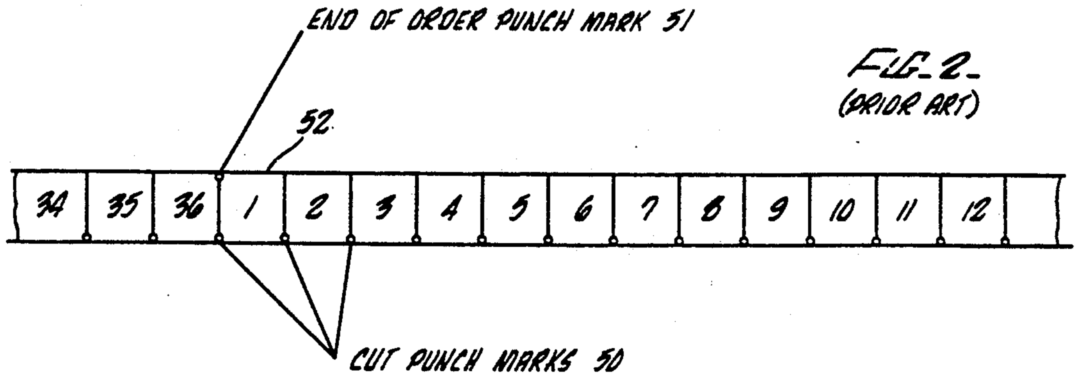
FIG. 2 (PRIOR ART)
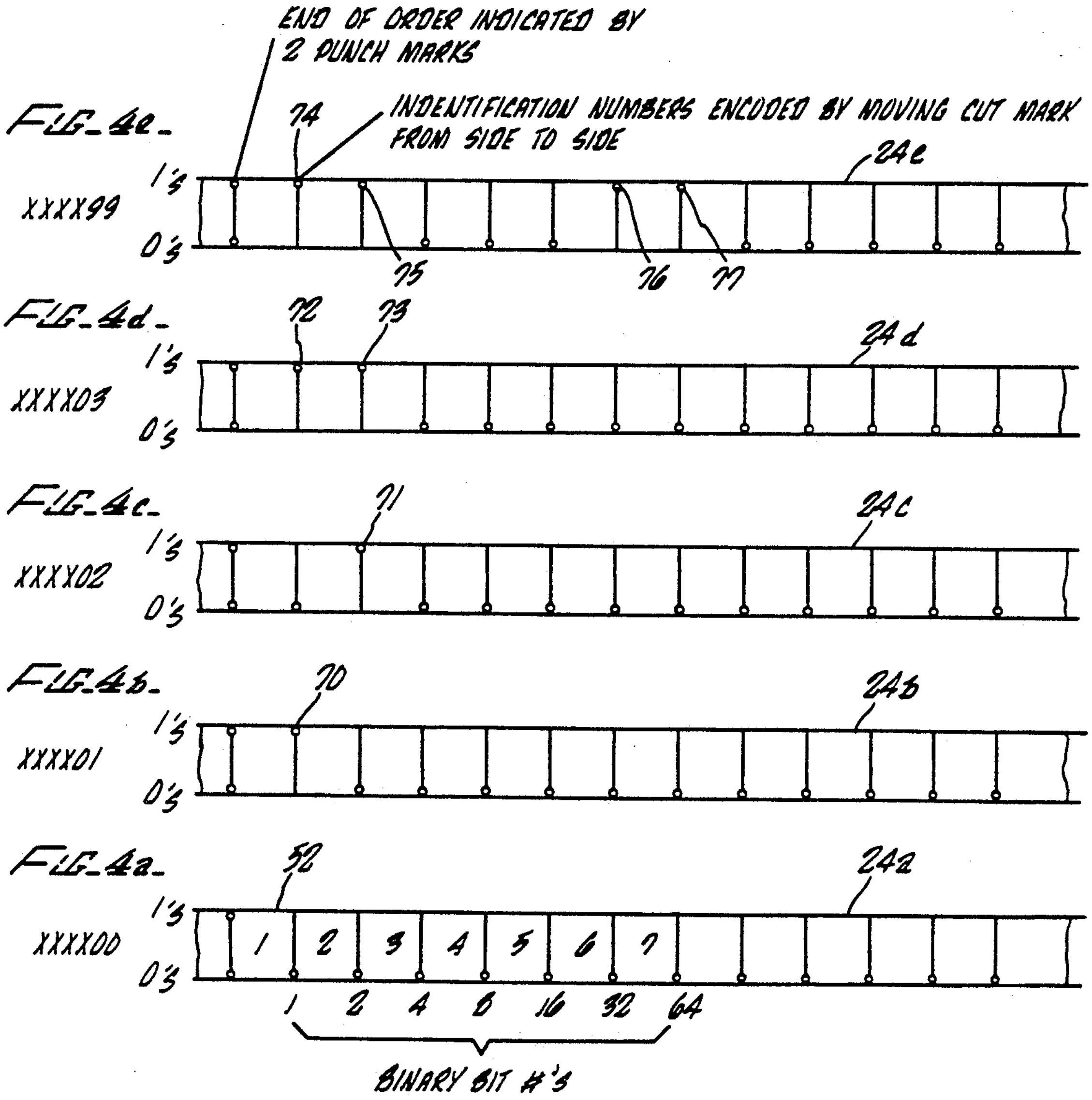
FIG. 4e
FIG. 4d
FIG. 4c
FIG. 4b
FIG. 4a

FIG. 11a
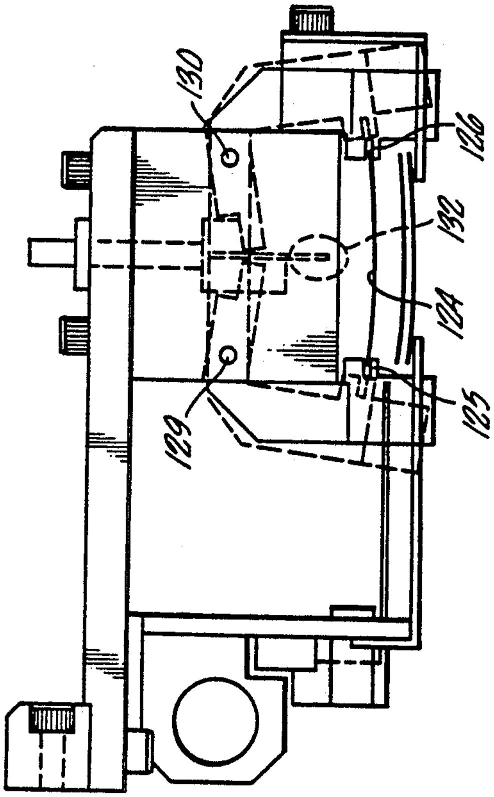
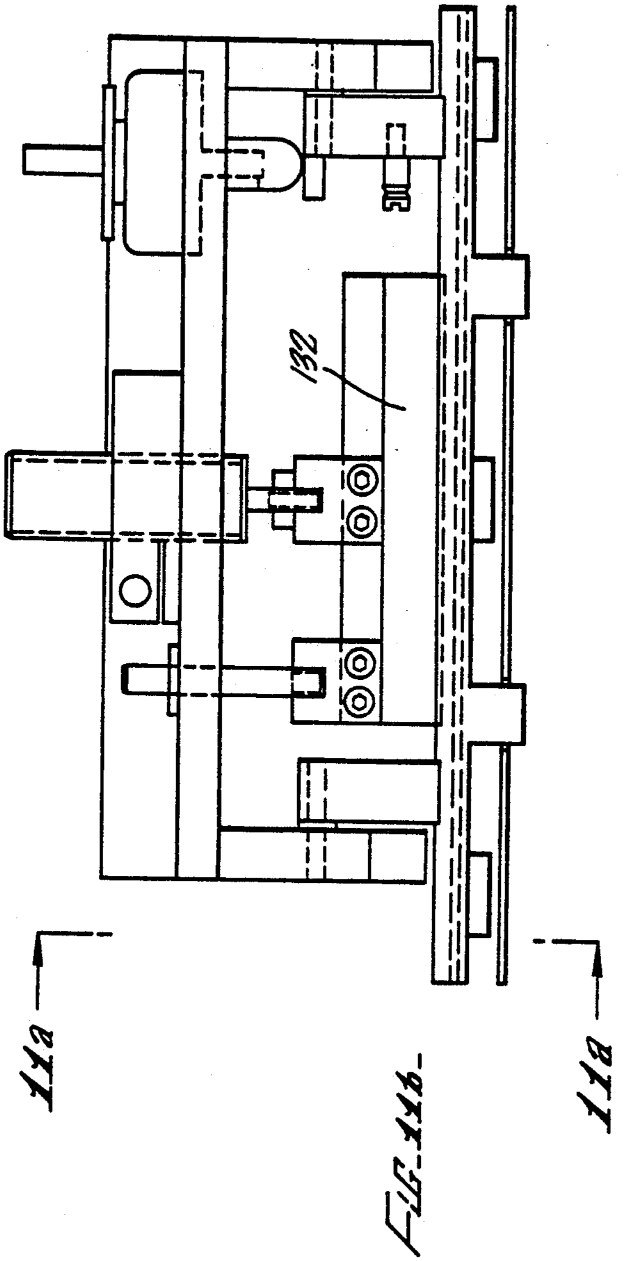
FIG. 11b

*DIAGRAM PRINTER ENCODING SYSTEM*

DIAGRAM PRINT ENCODING SYSTEM

PHOTOFINISHING APPARATUS AND METHOD

CROSS-REFERENCE TO RELATED APPLICATIONS

This is a continuation of copending application Ser. No. 07/537,294, filed Jun. 12, 1990 now U.S. Pat. No. 5,093,684 which application is a continuation-in-part application of co-pending U.S. patent application Ser. No. 279,463, filed Dec. 2, 1988, now U.S. Pat. No. 4,933,711 on Jun. 12, 1990 which is a continuation-in-part application of U.S. patent application Ser. No. 018,097, filed Feb. 20, 1987 now U.S. Pat. No. 4,821,061, which issued Apr. 11, 1989, the disclosures of which are hereby fully incorporated by reference herein as though set forth in full.

FIELD OF THE INVENTION

The present invention relates to the field of automated photofinishing packaging systems, and more particularly, to an improved apparatus for and method of associating prints with corresponding films in such a system.

BACKGROUND OF THE INVENTION

In large scale photofinishing plants or photo processing labs, the incoming films are removed from their order bags and are spliced together prior to processing into a large roll of typically about seventy-five films. At the time of splicing, the splicing machine applies an identification number to the splice on each film and to its respective order bag in which the film arrived at the lab.

The roll of spliced films is then developed, after which the developed roll is passed through a notcher or notching machine. This notcher scans the image area of the films and determines the center of each image. The machine then makes a small notch in the edge of the film to identify each frame. The purpose of the notch is to allow a subsequent printer to properly position the images of the film for printing of the images.

The next step in the usual prior system is to expose the frames of the developed film onto a roll of print paper. This is accomplished by the printer. The roll of print paper is then developed, and it is inspected for prints that are to be discarded (rejects) and prints that are to be made over to improve quality (remakes). Small black patches of tape usually are placed on the reject or remake prints to later be detected in a print cutter for sorting purposes.

Then, the roll of film, the roll of prints, and the corresponding stack of order bags are delivered to the packaging area of the lab where manual packaging is performed. This step puts the film and prints into the original order bag for return to the customer. A typical packaging material is a paper "wallet" having two pockets, one for the finished prints and one for the developed negatives. This paper wallet is placed in the order bag for return to the location (i.e., drugstore, etc.) where the film was originally left by the customer for developing.

The basic steps involved in packaging are:

1. Cut the prints from a continuous roll of print paper onto which they have been exposed (printed) and developed.

2. Cut into short pieces the roll of films (negatives) from the continuous roll of films into which they were spliced for processing and printing.

3. Check to see if the prints are the ones that match the negatives and if the negatives are the ones that belong to the order bag.

4. Insert the negatives and prints into the wallet and fold it closed.

5. Insert the wallet into the order bag and close its flap.

6. Calculate the price of the order and print it on the bag.

It sometimes is necessary to dispense one or two of the wallets depending on the number of prints (e.g., two sets) made for a given order. It also may be necessary to provide randomly fed wallets with graphics unique to one customer or another.

As noted above, such packaging presently is performed manually, and is a high cost, low productivity, labor intensive bottleneck in photo processing labs.

The invention described in U.S. Pat. No. 4,821,061 ("the '061 patent") is directed to a modular packaging system and accessory components which can interface with other equipment in a photofinishing plant or photo processing lab, and which can enable a automatic packaging system to be provided. In order to provide an automatic packaging system and to insure that the proper films and prints go into the proper order bag, as well as perform the other steps involved in packaging, several things must be done upstream of the packaging operation to allow for elimination of the need for a human operator. The invention in the '061 patent involves several concepts in facilitating such an automated packaging system.

A first concept pertains to a print encoding system for simply adding a code to the roll of prints, and which makes it possible to cross-check if the prints being cut by the print cutting portion of the packaging machine belong with the film and order bag being handled simultaneously by other parts of the system. This concept involves selectively punching holes at edges of the print paper to create a simple machine readable code.

Another concept according to the invention described in the '061 patent and which facilitates increased productivity involves the manner in which the prints are cut from the print roll. This concept involves continuously running the print cutting knife to eliminate the problems occasioned by the high mass of the cutting knife as it is periodically started and stopped as has been done in the past. According to this concept, the knife is run continuously and during the time the knife blades are open, the print paper is rapidly accelerated, a punch hole in the print paper is detected, and the punch hole is positioned under the knife before it cuts the print paper. This enables the packaging system to cycle at a very high speed and eliminates the need to start and stop the knife for each print cut.

A third concept according to the invention described in the '061 patent is the provision of an attachment usable with the film printer to make it possible to stop the film splice (between adjacent films) under the field of view of a bar code reader. This allows the bar code to be simply and reliably read in a film transport system in which the film moves in a somewhat irregular jerking motion as each frame of the film is stopped for its exposure onto the print film, and then advanced to the next film frame which may be an irregular distance from the previous frame. This concept also allows the use of a relatively inexpensive bar code reader rather than the very costly and highly sophisticated holographic bar code scanners.

A fourth concept relates to a technique and system for accumulating cut pieces of the film from the spliced film roll. This concept involves a tamper and movable guide means for allowing a cut strip of negatives to be moved into a stack of such strips. This arrangement eliminates the usual sliding of one negative strip onto another Which can result in scratched negatives and other problems. In addition, means can be provided for detecting and diverting leader cut from the film roll.

A fifth concept involves the use of a batch management computer for providing a file of information pertaining to what is happening to each film by receiving inputs from the splicer, printer and other sources.

The '061 patent describes three approaches for encoding the film identification number from the film splice bar code onto the print roll. In the first approach, the two least significant digits of the number are converted to binary and then encoded onto the individual prints of the print roll starting with the least significant digit. As shown in FIG. 4c, this approach will require at most seven prints to encode. In the second approach, all digits of the number are converted to binary, and then encoded onto the individual prints. With a six digit decimal identification number, this approach will require 20 prints to encode the entire number. In the third approach, each digit of the number is individually converted to binary, and then encoded onto individual prints. Since four bits are required to represent each digit, this approach will require 24 prints to fully encode the number.

It is common for a print roll for a particular customer's order to contain up to 72 prints, particularly if the customer has asked for duplicate prints. Because of packaging constraints, it may be necessary to break up the prints into two groupings of 36 prints each, which will be separately packaged. As a result, each grouping of 36 prints must be encoded with the same identification number. The above three approaches do not explicitly provide for encoding different groupings of prints with the same identification number, and therefore may not be ideal for encoding orders having a large number of individual prints.

In addition, the above three approaches advantageously require that the prints for large orders be packaged beginning with the first print in the order. With the above three approaches, if the prints for large orders are packaged beginning with the last print in the order, it will be difficult to split up the prints for separate packaging since all the prints may have to first be packaged so that the film identification number can be decoded. All the prints may have to first be packaged because there is no guarantee that the last prints in the order will be encoded with data for large orders. If an order consists of 36 prints, for example, in the first approach described above, only the first seven prints will be encoded with data; in the second approach described above, only the first 20 prints will be encoded with data; and in the third approach described above, only the first 24 prints will be encoded with data.

U.S. patent application Ser. No. 279,463 which issued as U.S. Pat. No. 4,933,711 on Jun. 12, 1990 describes an improved method and apparatus for encoding the identification data whereby the film identification number is first encoded onto the prints of a particular customer's order, and if more prints remain than are necessary to encode the identification number, the encoding of the number is repeated. As a result, if the prints are split up into different groupings of an appropriate size for separate packaging, the identification number will be encoded onto and hence obtainable from prints in the different groupings. In addition, for large orders, the prints can now be packaged beginning with the last print in the order, since the identification number can be decided during packaging from only part of the prints.

In addition, the encodings of the film identification number are separated by the encoding of synchronization bits which are distinguishable from the encoded identification number. The synchronization bits enable the different encodings of the film identification number to be distinguished from each other.

The present invention relates to the identification number encoded onto the prints corresponding to a film. In a typical approach, the identification number encoded is the same number as is decoded from the film. A photofinishing packaging system which encodes the same identification number read from a film onto the corresponding prints generated from the film has certain disadvantages, however.

A first disadvantage is that such a system will be unable to uniquely identify the multiple sets of prints generated by running the film multiple times through the printer, which may occur in the event that a problem is encountered in feeding the film through the printer the first time through. In this event, multiple passes will be required with prints being generated at each pass, and it may be desirable to uniquely identify each set of prints.

A second disadvantage is that such a system will not allow a different identification number than that read from the film to be encoded into the corresponding prints so that a number will be available to encode onto the prints. Therefore, such a system may lack a certain amount of flexibility.

A third disadvantage is that such a system will not typically allow an identification number to be encoded onto the prints in the event that the film is unreadable, or at least allow a "no read" indicator to be encoded indicating this.

A fourth disadvantage is that the reading of the film identification number in such a system must take place before the encoding of the corresponding prints. As a result, this limits the relative placement of the components of the system (and therefore the system's flexibility) used to perform the functions of film reading and print encoding.

Accordingly, it is an object of the subject invention to provide an apparatus (and related method) adapted to encode identification indicia onto prints associated with a film splice, which indicia uniquely identifies prints for a particular pass of the film splice through the printer, which indicia is encodable, even though the bar code from the splice may be unreadable, and which indicia is encodable even before the bar code from the film splice is read.

SUMMARY OF THE INVENTION

To achieve the foregoing objects, and in accordance with the purpose of the invention as embodied and broadly described herein, there is provided a method for packaging prints with a corresponding film, comprising: reading first identification indicia from the film; generating second identification indicia; encoding the second identification indicia onto the corresponding prints, the prints being in a print roll having first and second edges, and boundaries between successive prints, by selectively making notches in either the first or second edges of the print roll at the boundaries between successive prints in accordance with said second identification indicia; forming a pairing between the first and second identification indicia; storing the pairing; and packaging the prints with the corresponding film using said pairing.

A related apparatus is also provided.

BRIEF DESCRIPTION OF DRAWINGS

These and other objects and features of the present invention will become better understood through a consideration of the following description, taken in conjunction with the drawings in which:

FIG. 2 is a diagram of a prior art print encoding technique;

FIGS. 4*a* and 5 illustrate two different print encoding techniques provided by the system of FIG. 3 according to the invention described in the '061 patent;

FIGS. 7*a* and 7*b* are more detailed versions of FIG. 6*a* and which further illustrate the details of the print cutting system of the invention described in the '061 patent;

FIGS. 11*a* and 11*b* are a more detailed end view and elevation view respectively of the movable edge guide, gripper and tamper system of the film accumulator of FIG. 10;

DETAILED DESCRIPTION

Figure 1A:
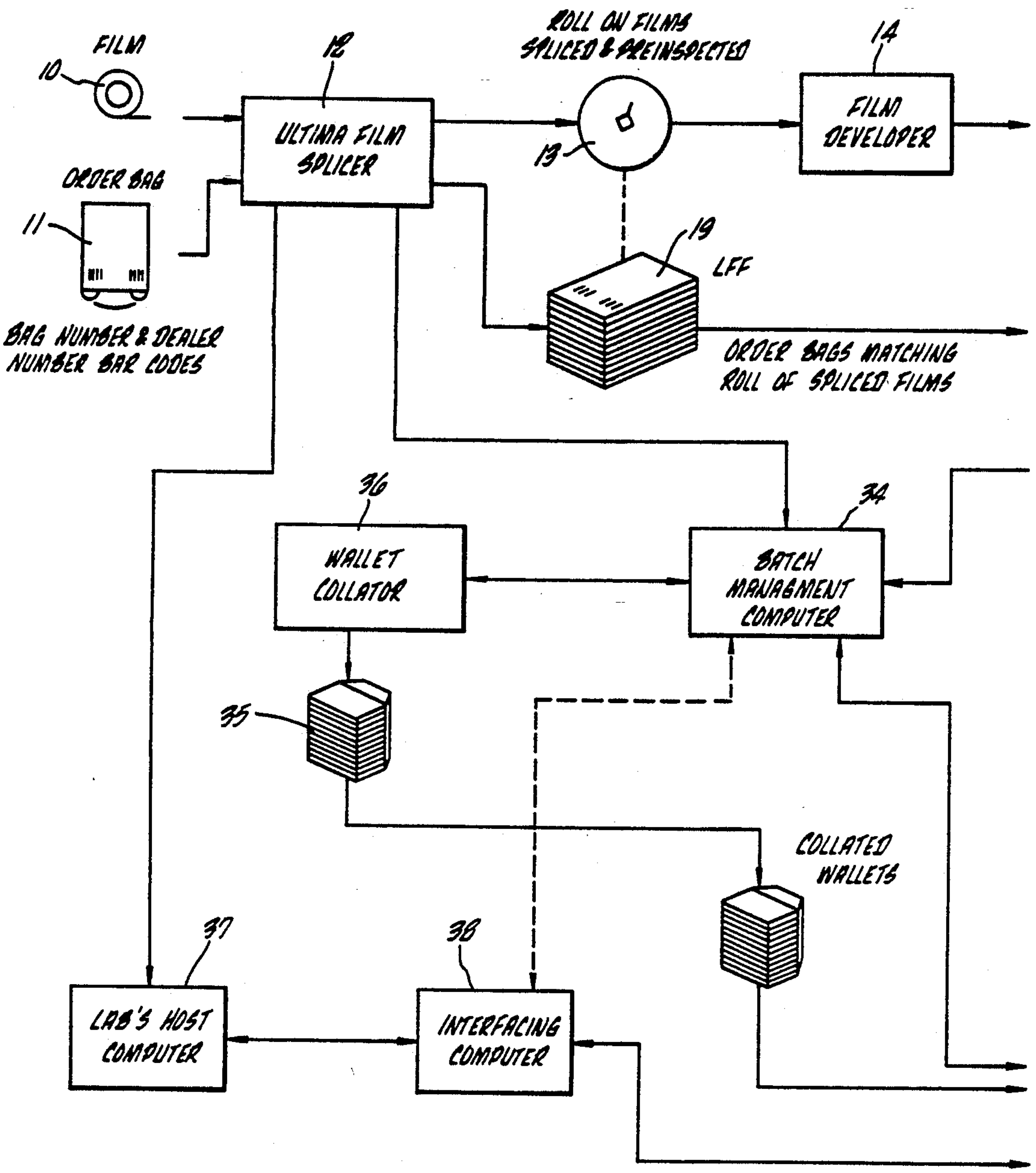
FIGS. 1*a* and 1*b* (taken together side by side) illustrate in overall block diagram form a photofinishing system incorporating concepts of the invention described in the '061 patent.
Figure 1:
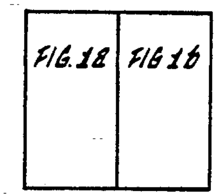
Figure 1B:
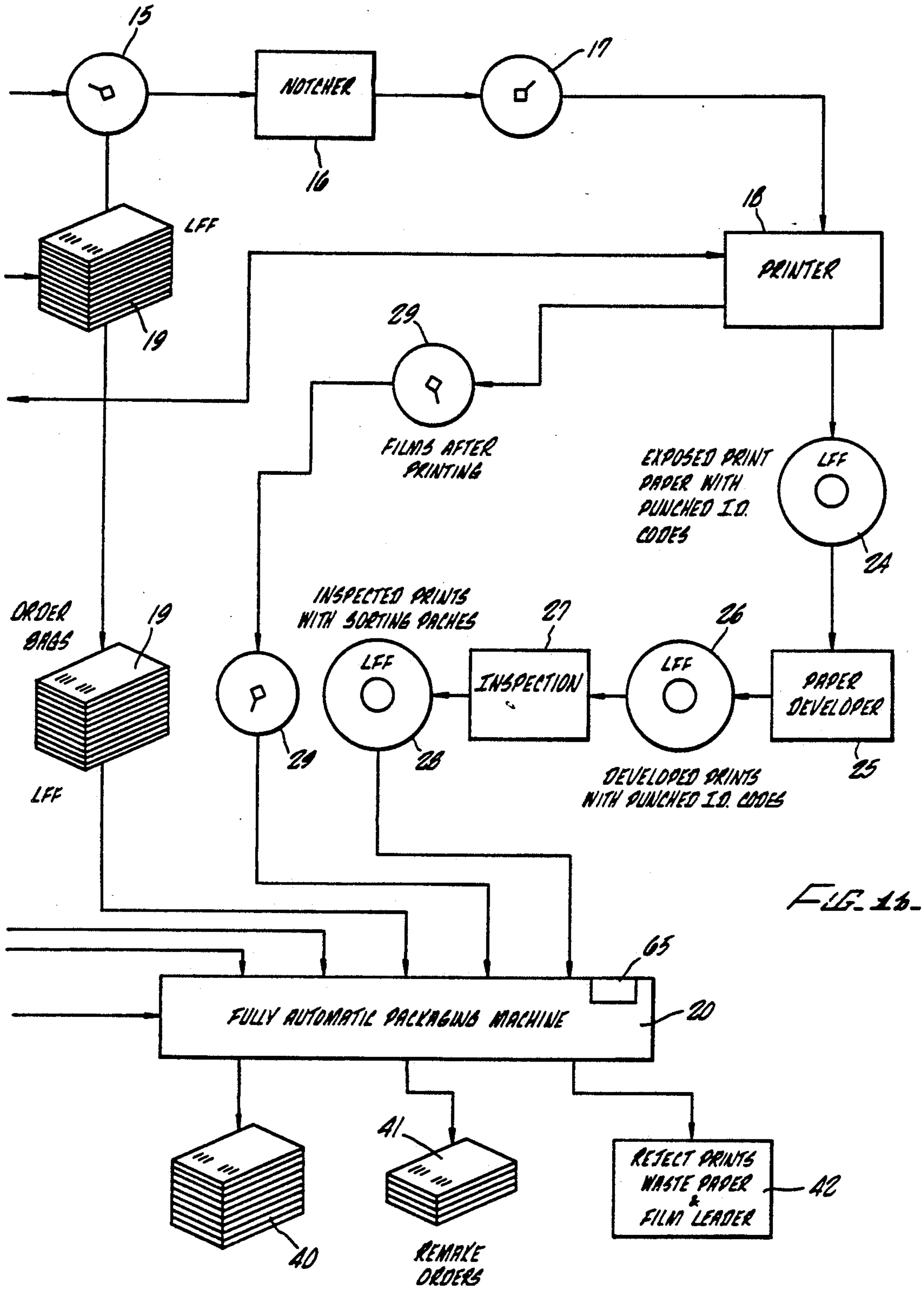

Turning first to FIGS. 1*a*–1*b*, the same illustrate an overall photofinishing or photo processing lab incorporating the concepts of the invention described in the '061 patent. Film 10 is removed from an order bag 11, and both are sent to a film splicer 12 which splices together a number of rolls of film in a conventional manner. As is known, the typical order bag is bar coded with a dealer number and a bag number, with the latter number also being the claim check number. Also as is known, the films typically are spliced together with a tape splice, with each such spliced tape having a preprinted sequential bar code different from that on the bag, and sometimes also an eye-readable number. The bar code numbers from the bag and the splice are "crisscrossed" or cross-referenced in eye-readable form by the splicer 12; that is, the bar code from the splice is read and applied in numerical form to the bag, and the bag number bar code from the bag is read and applied in numerical form to the splice. The splice bar code alternatively can be read and applied to the bag in both eye-readable and in bar code form, and this can facilitate simplifying the record keeping aspects of a photo processing system. After the coding and imprinting has taken place, the order bags 11 are stacked as indicated at 19 (FIG. 1*a*) and are sent to an automatic packaging machine 20 (seen at the bottoms of FIGS. 1*a* and 1*b*) for later use in packaging the film and print order.

The spliced together films 13 then go to a film developer 14 which develops the negatives, and the developed film 15 (FIG. 1*b*) is applied to a notcher 16 which makes conventional frame notches in the film used by the film printer for indexing. The notched films 17 which are ready to print are supplied to a printer 18.

The printer prints each frame of film onto a roll of print paper. The printer 18 also includes an attachment according to the invention described in the '061 patent that reads the bar code on the splice between each spliced-together set of films, and controls punches in a manner according to that invention to encode numbers (typically in binary or binary coded decimal form) onto the roll of prints according to each film order. The details of this encoding technique will be explained later.

The exposed roll of prints 24 goes through a print paper developer 25, and the developed prints 26 can move to an inspection station 27 where black patches can be applied to the leader to indicate a remake or reject in a conventional manner. These patches typically in existing equipment are placed on the right and left sides of the print paper to respectively indicate rejects and remakes. In accordance with the present concepts, an additional patch of this nature can be added in the center of the print paper to indicate a leader or waste paper which is to be cut off or discarded from the print roll. The roll of prints 28 then moves to the packaging machine 20. The roll 29 of films after printing leaves the printer 18 and also moves to the packaging machine 20.

A batch management computer 34 (FIG. 1*a*) receives information from various subsystems of the overall system, and keeps track of the various information needed for insuring orderly operation of the system and bringing together at the end the appropriate processed negatives 29, prints 28, paper wallets 35 and order bags 19. The computer 34 is connected to various components and subsystems, and will be described in greater detail subsequently.

The lab system further includes a wallet collator 36 (FIG. 1*a*) which supplies the stack of wallets 35 to the packaging machine 20. Typical photo processing labs include a host computer 37 as is well known, and the same can be interfaced with the batch management computer 34 and packaging machine 20 by an interfacing computer 3 if desired.

The packaging machine 20 cuts the developed film into film strips, cuts the prints apart, and packages the film strips and prints into the wallet. The wallet is then loaded into the order bags which are suitably priced and stacked as shown at 40. Cross-checking between the order bag, film and prints is performed based on information received from the batch management computer 34, along with reading the order bag and film splice bar codes. Print matching is performed by decoding the cut mark punch locations in the print roll which were added by the printer 18 as will be described subsequently, and comparing the resulting code or number with the bar code number on the film splice. Remake orders are shown at 41, and reject prints, waste paper and film leader are shown at 42.

Figure 3:
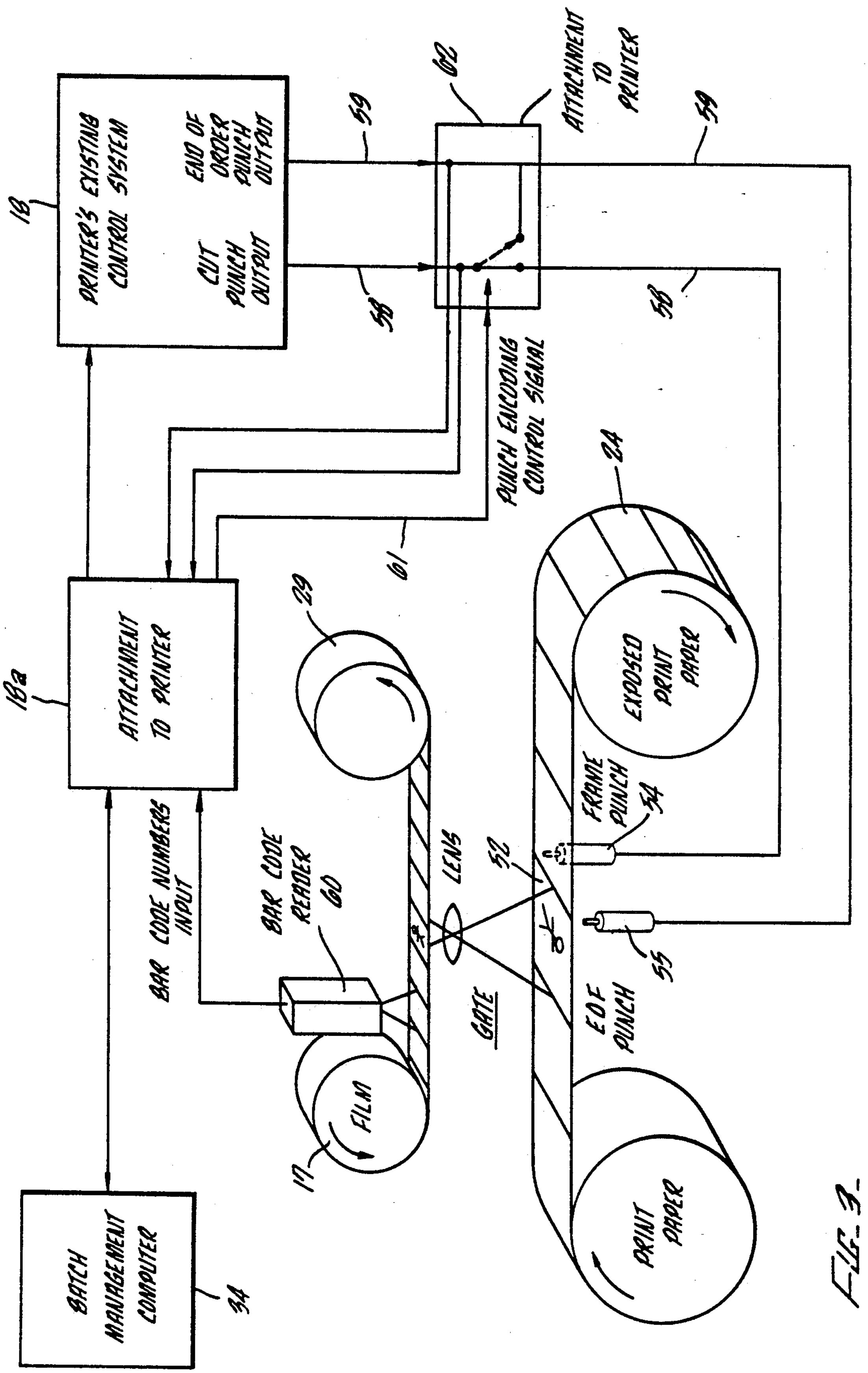
FIG. 3 is a block diagram of a print encoding system incorporating the concepts of the invention described in the '061 patent.

Turning now to the print encoding technique and system according to the invention described in the '061 patent, the same makes it possible to cross-check if the prints being cut by the print cutting portion of the packaging machine 20 belong with the film and order bag being handled simultaneously by other parts of the packaging machine 20. In order to check if the prints and films match, it is necessary to add some kind of information on the prints that can be read by the packaging machine 20. This is done, as will be explained below, by controlling and varying the position of punched holes that are presently used to indicate the cutting line between individual prints and the cutting line at the end of one film's set of prints and the next. Present prior art systems punch holes in the roll of prints as illustrated in FIG. 2. One hole is punched in the waste boundary between every print 52, and these are labeled cut punch marks 50 in FIG. 2. Each of these holes is near the edge of the paper and occurs on that edge in such prior systems. Another punch hole 51 is located exactly opposite to a cut punch 50 at the other edge of the print paper as seen in FIG. 2, and this punch hole exists only where there is a boundary between the prints (e.g., frames 36 and 1) belonging to adjacent separate films. These holes are made by respective punches 54 and 55 as shown in FIG. 3. These punches 54 and 55 are part of the conventional printer, and are controlled by the printer such that the frame or cut punch 54 is fired or energized after each print paper advance, and the "end of order" punch (EOF) 55 is energized or fired after a splice joining two films as detected by a sensors in the film track of the printer 18.

According to this print encoding technique, the bar code number on the splice between films is read from the film roll by a bar code reader 60 as the splice approaches the film gate of the printer 18. That bar code is stored in the memory of a printer attachment 18*a* (FIG. 3) and after the printer 18 has sent a signal 59 to its end of order punch 55, the cut punch output 58 is selectively made to go to either the punch 54 or the punch 55 so as to selectively punch a hole on one edge of the print paper or the other edge of the print paper in a form of pattern that represents the one's and ten's digits (0 through 99) of the splice bar code number.

With this approach, there will always be two holes at the boundary between the prints from adjacent films, and one hole for each cut position between prints, but this latter cut hole differs from the prior art systems in that this latter cut hole according to the invention described in the '061 patent is caused to occur selectively on either edge of the paper. In this regard, reference should now be made to FIG. 4 which shows in FIGS. 4*a*–4*e* a sequence of respective print rolls 24*a*–24*e* wherein each is encoded in binary fashion in this manner with different numbers. The lower edge of each print roll can be considered to be the 0's edge and the upper edge can be considered to be the 1's edge. Each print 52 up through the seventh print in this example represents a binary bit. In FIG. 4*a*, the coding represents zero because al) the cut punch marks are on the bottom edge (as is conventional). However, in FIG. 4*b* the first cut punch hole 70 has been made at the top edge, thereby representing a binary one, and thus a decimal 1. In FIG. 4*c*, the second cut punch hole 71 is a binary 1 representing binary 01, thus equalling the decimal number 2. In FIG. 4*d*, the first and second cut punch holes 72 and 73 are 1's representing binary 11 and the decimal 3. Finally, in FIG. 4*e*, the first, second, sixth and seventh out punch holes 74–77 are 1's thereby representing decimal 99 ($1+2+32+64=99$).

Figure 5:
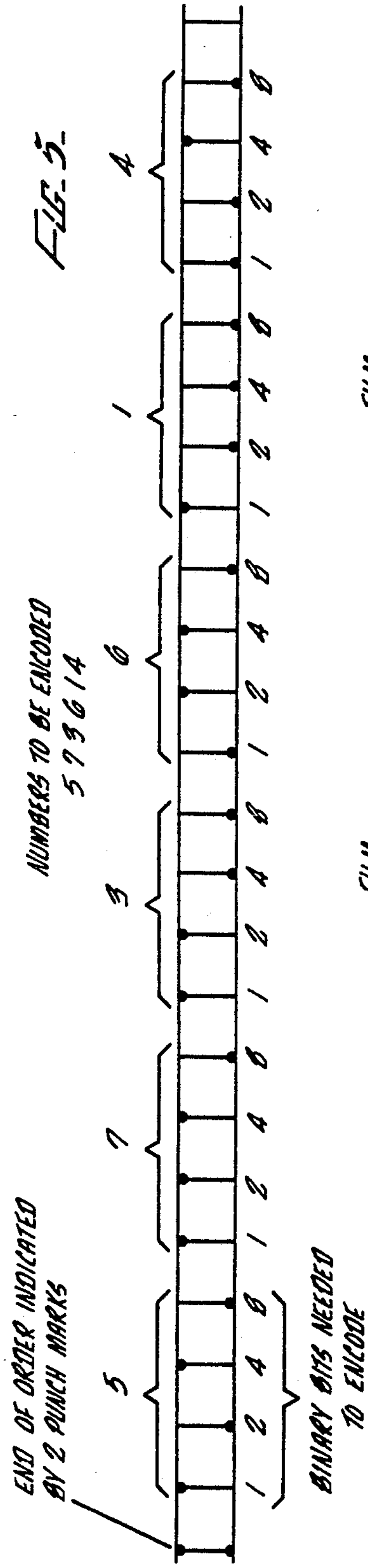

Turning again to FIG. 3, the roll of film 17 to be printed onto the print paper 52 is illustrated, as well as the control system of the printer 18 for providing a cut punch signal 58 to the frame punch 54 and an end of order punch signal 59 to the end of order punch 58 as is conventional. The system of FIG. 3 further includes the bar code reader 60 which reads the bar code from the splice between films, and sends the bar code to a control attachment 18*a* for the printer 18. The control 18*a* receives the signals 58 and 59 from the printer control, and provides a punch encoding control signal 61 to a switch 62 to selectively cause the cut punch output 58 from the printer 18 to go to either the frame cut punch 54 or to the end of order punch 55 so as to accomplish the encoding of the print roll as illustrated in FIGS. 4 and 5. The control 18*a* thus selectively allows the signal 58 to be applied from the printer control 18 to the punch 54 to encode 0's, or inhibits this operation and causes the signal 58 to be applied to the end of order (EOF) 55 to encode 1's. The end of order signal 59 is still applied in a normal fashion to indicate the end of an order.

The packaging machine 20 includes an optical sensor 65 for detecting the encoded punch holes in the print roll. As the film/print orders run through the packaging machine 20, it can keep track of the pattern it has detected when cutting the prints of a given order and then decode that information into the number that it represents. This number then is compared with the bar coded identification number from the splice of the corresponding film to determine if the last two digits match. If there is a match, the packaging machine will complete the packaging cycle but, if not, an alarm or other suitable indication can be provided to alert the operator to the error.

Another variation of the encoding technique as shown in FIG. 4 is to decode the film splice bar code at the printer 18 and encode it into the entire binary pattern that would represent all digits of the splice bar code number. This becomes a 21 digit binary number for a six-digit decimal splice bar code number. That pattern can be punched into the print roll as the prints are printed. If there are fewer than the twenty-one prints required to encode the full six-digit number (e.g., in a 12 or 20 exposure roll), there will be at least a partial pattern provided and which should be sufficient for identification purposes. At the packaging machine 20, as the films are cut into film strips, the bar code on each film splice can be read by a scanner and decoded into the binary pattern that should have been punched on the roll of prints. This code then can be compared with the code detected from the prints as they are cut. If there are not enough prints made to punch the complete binary pattern, the partial pattern is compared with the equivalent part of the pattern that was decoded from the film's bar code. If the partial patterns match, then the prints belong to the film and the packaging machine can proceed with the packaging.

Another variation of the encoding concept is illustrated in FIG. 5 and involves decoding the splice bar code number and punching it into the print roll as described above, but to punch a binary coded decimal (BCD) pattern instead of a pure binary code as illustrated in FIG. 4. With this encoding, the first four prints contain the four bits of the binary code to represent zero through nine in the one's digit of the number. The second four prints will contain the bits needed to give the ten's digit of the number, and so on until all of the digits have been encoded. This requires twenty-four punch marks for a six-digit number as will be apparent from FIG. 5.

Figure 13:
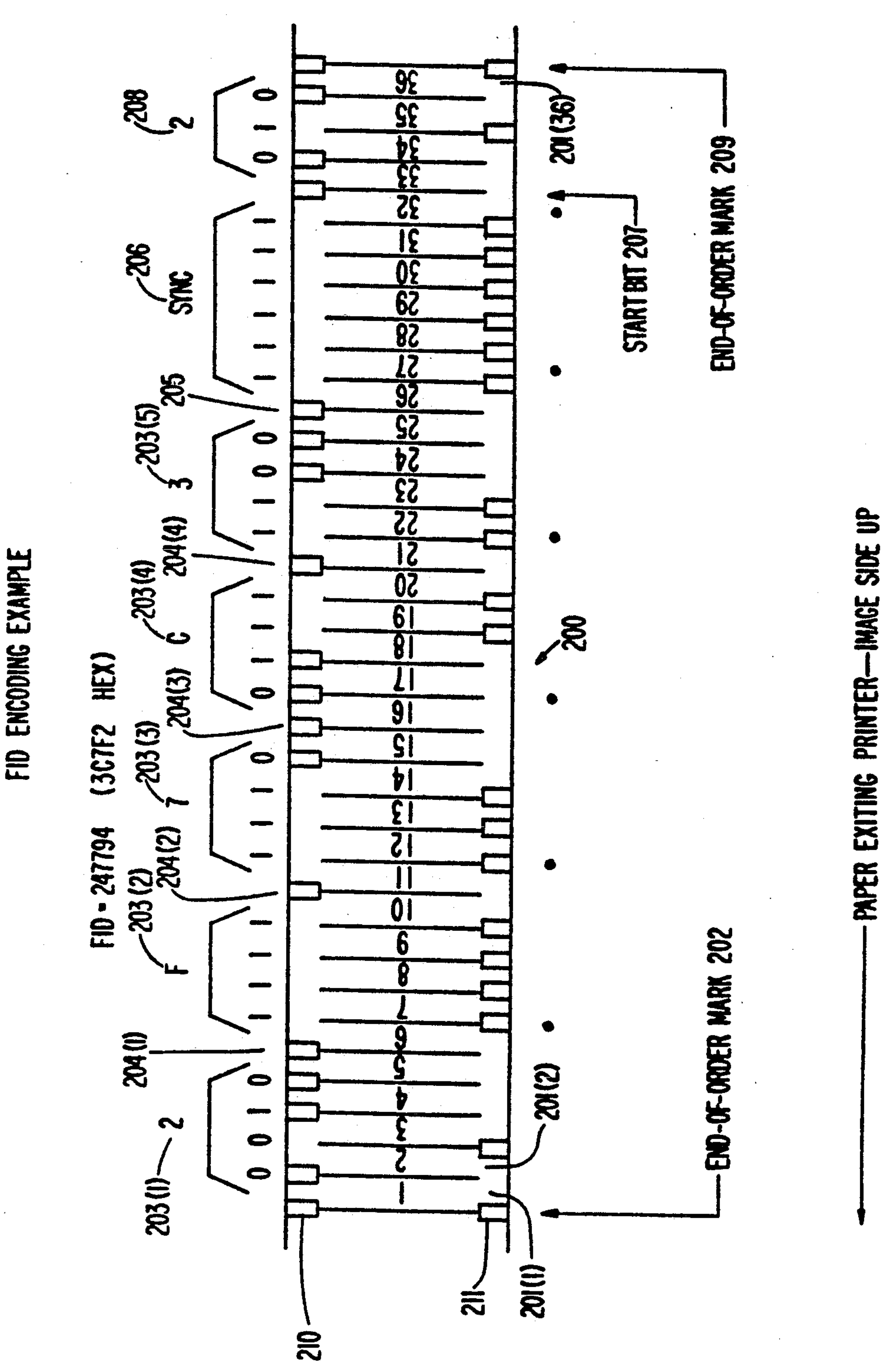
FIG. 13 illustrates the print encoding technique of U.S. patent application Ser. No. 279,463.

The encoding technique of an embodiment which is the subject of U.S. patent application Ser. No. 279,463 now U.S. Pat. No. 4,933,711 is illustrated in FIG. 13. As with the techniques described above, this technique involves decoding the splice bar code number and encoding it through selective punching of the edges of the individual prints of the print roll. As with the other encoding techniques, the splice bar code number is first decoded to form a 6-digit decimal ASCII film identification number. The decoded film identification number is then converted to a 5 digit hexadecimal number. The hexadecimal number is then encoded onto the roll of print paper least significant digit first. The least significant digits are encoded first since there may not be enough prints for a particular order to encode the entire identification number, and the least significant digits will be most important for determining sequencing of this particular order compared with other orders, and for cross-checking with the film splice and order bag bar codes during packaging.

Before the hexadecimal digits are encoded, as with the other techniques, an end-of-order mark is encoded onto the print roll by punching holes onto both sides of the print roll. Next, the identification number is encoded, least significant digit first, one hexadecimal digit at a time. Each hexadecimal digit is first translated into four binary bits, and the bits are successively encoded by selectively punching the edges of the print roll at the boundaries between successive prints. As with the other techniques discussed above, one punch will appear per boundary to encode the bits, and a binary "0" will be encoded by punching one edge of the print roll, while a binary "1" will be encoded by punching the other edge of the print roll.

After every hexadecimal digit (or equivalently four bits) has been encoded, a binary "0" will be encoded, which bit represents a framing bit. This process is repeated until all five hexadecimal digits have been encoded.

After the fifth hexadecimal digit has been encoded, a binary "0" will be encoded, which bit represents a stop bit. In addition, six binary "1's" will then be encoded in succession, which bits represent synchronization bits. Note that the synchronization bits will always be distinguishable from the encoded identification data since the framing bits prevent the encoded identification data from ever containing more than four consecutive binary "1's" in succession.

If more prints remain in the particular order than necessary to encode the identification number, the process of encoding the number is begun again and repeated until substantially all the prints in the order have been encoded with data. First, a binary "0" start bit will be encoded. Then, in the manner discussed above, the number will be at least partially re-encoded one hexadecimal digit at a time with a framing bit encoded after each hexadecimal digit. In addition, as above, if all the digits are re-encoded, a stop bit, and synchronization bits will also be re-encoded after the re-encoding of the number.

Encoding data on substantially all the prints is important if packaging constraints require that prints for a particular order be broken up into more than one grouping for packaging. At present, for example, a package can hold at most 40 prints, so that a print order of 80 prints must be split into two groups destined for separate packages. Encoding the identification number onto substantially all the prints enables the prints to be split up into different groupings and still be identified with a particular order via the encoded data.

Another benefit of the above approach is that it allows the prints in a large order to be split up and packaged beginning with the last print in the order, and the identification number decoded during packaging from only part of the prints. With the three approaches described in the '061 patent, particularly for large orders, it is advantageous to package the films beginning with the first print in the order to be able to split up the prints and still decode the identification number. This is because for large orders, the last prints in the order may not be encoded with identification data, and if the prints are packaged beginning with the last print in the order, all the prints may have to be packaged before the identification number can be decoded.

With reference to FIG. 13, which illustrates the above technique, the film identification number to be encoded is decimal 247794. As indicated in FIG. 13, this number is first converted to hexadecimal 3C7F2.

The hexadecimal number is then encoded onto print roll 200, which as indicated in the Figure, comprises 36 individual prints, identified respectively as 201(1), 201(2), . . . , 201(36). Before the hexadecimal number is encoded, an end-of-order mark 202 is encoded by both punching a notch in the top edge of the print roll, indicated by 210 in FIG. 13, representing a binary "0", and at the same time, punching a notch in the bottom edge of the print roll, indicated by 211 in FIG. 13, representing a binary "1".

Next, as indicated in FIG. 13, the hexadecimal film identification number is encoded onto the print roll, one hexadecimal digit (representing four binary bits) at a time starting with the least significant digit. Each hexadecimal digit is first translated into four binary bits before encoding. The binary bits are successively encoded beginning with the least significant bit by selectively punching notches in either the top or bottom edges of the print roll at the boundaries between successive prints, one notch per boundary. The encoding of each hexadecimal digit is followed by the encoding of a binary "0" representing a framing bit. In FIG. 13, hex digits 2, F, 7, C, 3 are respectively translated into the four bit groupings "0010," "1111," "0111," "1100," and "0011," (shown least significant bit first from left to right) which are each encoded least significant bit first following by the encoding of a binary "0" for a framing bit. As indicated in FIG. 13, the four bit groupings for the hex digits are identified as 203(1), 203(2), 203(3), 203(4), and 203(5), and their respective framing bits are identified as 204(1), 204(2), 204(3), and 204(4).

After the hexadecimal digits and the framing bits have been encoded, a stop bit, which is a binary "0" and is identified as 205 in FIG. 13, is encoded. This is followed by the encoding of six consecutive binary "1's," which bits represent synchronization bits and which are identified as 206 in FIG. 13.

As indicated in FIG. 13, the encoding of the end-of-order mark, the five hexadecimal digit identification number and associated framing bits, the stop bit, and the synchronization bits, will require 31 prints to encode. Since a typical order will be made up of 36 prints, there will typically be room for encoding additional data onto the print roll. This will be accomplished in the example described above by repeating and continuing the process of encoding the identification number until substantially all remaining prints have been encoded. First, a start bit represented by a binary "0" will be encoded followed by at least the partial re-encoding of the hexadecimal digits and their associated framing bits. In FIG. 13, the start bit is identified by 207. As indicated, there is only enough room to encode three bits from the first hex digit 2 (which bits are "010", least significant bit first), which three bits are identified as 208 in FIG. 13. Finally, the end-of-order mark is encoded, which is identified as 209 in FIG. 13.

Note that the above technique allows packaging of the print roll (and hence decoding of meaningful identification data) for large orders beginning with the last print in the order from only part of the prints. This will facilitate splitting up the prints for separate packaging. At present, with the encoding techniques described in the '061 patent, packaging must advantageously begin with the first print in order to decode meaningful identification data from only part of the prints.

Moreover, as discussed earlier, the synchronization data will always be distinguishable from the film identification data, since the placing of the binary "0" framing bit after every four identification bits prevents the encoded film identification data from ever having six binary "1's" in a row. As a result, the synchronization data can be used to distinguish between encodings of the film identification number. Without the synchronization bits, the repeated encodings of the film identification number could not be distinguished, and the proper decoding of the film identification number during packaging could not be accomplished.

Also, since a typical 36 print order also may allow for the obtaining of duplicate prints, a print roll for such an order may comprise 72 prints. In this instance, the sequence of encoding the film identification data and the framing bits, followed by the stop bit, the synchronization bits, the start bit, and then the re-encoding of at least part of the film identification data and the associated framing bits, will be repeated until substantially all 72 prints have been encoded. As discussed earlier, this will allow breaking up of the order into two groupings of 36 prints each destined for separate packaging. Since the same film identification number can be obtained from both groupings, both groupings can be associated with the same order.

Turning back to FIG. 3, the printer attachment 18*a* signals the punches to encode the bar code, previously read by bar code reader 60 from the corresponding film splice, onto the prints assorted with the film splice, by signalling the punches 54 and 55 to notch successive boundaries between the individual prints in accordance with the number decoded from the bar code.

According to the subject invention, in an alternative embodiment to the above, printer attachment 18*a* generates a number, which may either be sequential, random, or the like, and which may be different from the splice bar code number, and encodes this number onto the prints. Then, the number that was decoded from the film splice bar code, and the number that was encoded onto the prints, are sent as a pair to the batch management computer ("BMC") 34, where they are kept in a file (e.g., a sequential file or the like) for future cross-referencing, and for purposes of matching the prints later on with the corresponding film splice.

An advantage of this embodiment is that in the event that a film splice is required to be passed through the printer multiple times, e.g., in the case where the film splice is incorrectly read on a first pass, and an additional pass or passes is required to read the splice correctly, the above embodiment enables the prints generated from a particular pass to be uniquely identified and therefore distinguished from the prints generated from other passes. This will be the case even though all the prints will have been generated from the same film splice.

Another advantage is that this, embodiment will enable a different identification number than that read from the splice bar code to be encoded onto the corresponding prints, and thus will provide additional flexibility.

This embodiment will also be advantageous in the event that the film splice bar code is unreadable. In this event, an identification number or at least a "no read" field indicating that the corresponding film splice bar code was unreadable can still be encoded onto the prints. Encoding such a field can still help facilitate matching up the prints with the corresponding prints during packaging.

In addition, this embodiment will also provide additional flexibility in the relative placement of the bar code reader (identified with numeral 60 in FIG. 3) and the print punch encoder (typically located at the print exposure gate—illustrated but not identified in FIG. 3), and will even allow the bar code reader to be situated downstream in the processing sequence from the encoder. In this instance, the encoder can begin encoding even before the splice bar code has been read. In the instance where the bar code reader and the print encoder are widely separated, i.e., separated by a distance greater than the length of the film splice, the likelihood that the identification number read from the splice will not be associated with the correct end-of-order punch firing (triggered by the arrival of the film at the print exposure gate, and which further triggers the encoding of the prints for the next order) and therefore will not be paired with the correct identification number encoded onto the prints increases since there is a chance that the film splice will move abnormally as it is fed into the printer causing the synchronization between the splice and prints to be lost.

Because of the large distance involved, in the case where the exposure gate (and print encoder) precedes the bar code reader in the processing sequence, multiple end-of-order firings (and encoded identification numbers) will be available for pairing at the time a particular splice bar code number is being read. Conversely, in the case where the splice bar code reader precedes the exposure gate in the processing sequence, multiple splice bar code numbers will be available for pairing at the time of a particular end-of-order firing and encoding of a print identification number. Abnormal movement, misfeeding, or jamming of the film may require an operator to move the film splicer around to remove the jam, which, in turn, may break the synchronization between the film and prints, and cause the incorrect pairing to occur.

Figure 14:
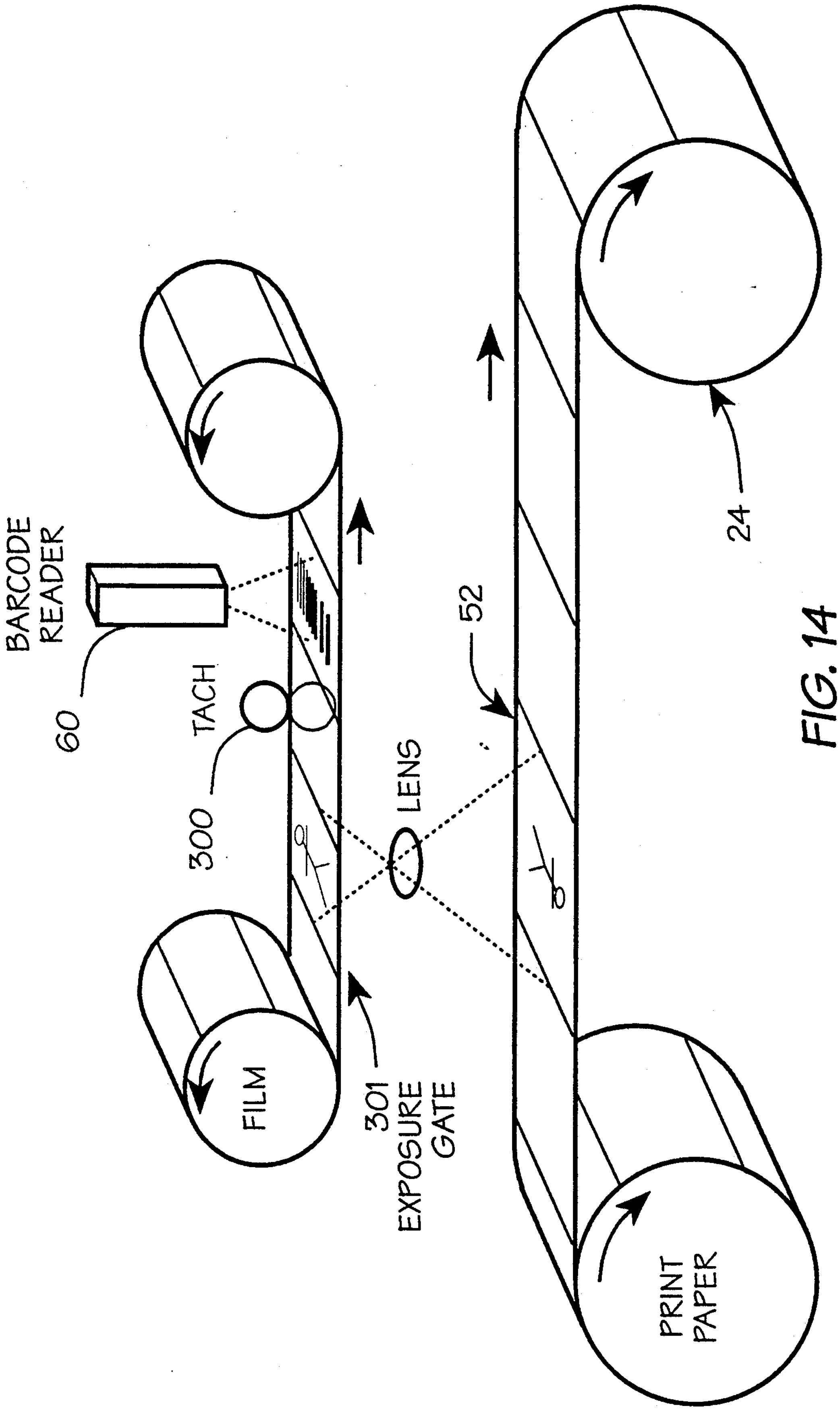
FIG. 14 is a diagram illustrating in general the concept of decoding a splice bar code downstream from the encoding of the corresponding prints.

Therefore, in accordance with the subject invention, means are provided to track the movement of the film so that the correct pairing can be effectuated. Turning to FIG. 14, in which like elements are referenced with like reference numerals, the placement of bar code reader 60 is shown downstream from exposure gate 301 (It is assumed that the distance between the exposure gate and the bar code reader is much greater than the length of a typical film splice so that multiple splices can fit between the exposure gate and the bar code reader). In this instance, when a particular film splice arrives at the exposure gate, triggering the punching of an end-of-order mark onto the print roll, and also triggering the beginning of the encoding of the prints corresponding to the film splice, the bar code from the film splice has not even been read yet. According to the subject invention, a unique identification number will be encoded onto the prints, but means must be provided to ensure that this number will be correctly associated with the bar coded number eventually read from the film, even if the film splice experiences abnormal movement after it leaves the exposure gate and before it reaches the bar code reader.

This is accomplished through the addition of tachometer assembly 300, which tracks the film direction and movement after it leaves the exposure gate. Through the addition of the tachometer assembly, it is possible to better track the movement of the film splice after it has left the exposure gate, but before it arrives at the bar code reader. By doing so, the tachometer will help maintain the synchronization between the film and the corresponding prints, and also will more accurately "pair" the identification number encoded onto the prints with the bar code number read from the correct film splice. In the case mentioned earlier, where an operator has moved the film around after a jam, the tachometer will maintain the synchronization between the film and prints, and therefore assume the correct pairings.

In general terms, the tachometer assembly performs the following functions:

1. Detects the presence of a batch of negatives in the printer.

The tachometer assembly typically comprises a tachometer, and a negative sensor for detecting the presence of a batch of negatives in the overall tachometer assembly. The negative sensor is typically coupled to the printer interface attachment, which in turn, is coupled to the BMC. When the presence of negatives is detected by the sensor, the printer interface attachment initializes and sends a start batch message to the BMC (as discussed earlier, a batch comprises a plurality of film strips of negatives spliced together). At the completion of the processing of the batch, when the sensor goes clear, an end batch message is transmitted to the BMC.

2. Detects the movement and direction of the negatives.

The tachometer assembly also typically includes motion and direction sensors which detect sprocket holes located along the edge of the negatives as they pass by the motion and direction sensors, and which enable the tachometer assembly to maintain a running count of the number of sprocket holes which have moved past the sensors during a given reference period. The sensors also detect the direction of the film, enabling the tachometer count to be incremented or decremented based on the direction of the film. The counts are transmitted to the BMC upon the occurrence of the following events:

a. Splice Detect (see below)
b. Splice Read (see below)
c. End of Order
d. Film Reversal The tachometer count along with an indicator of the corresponding events provides positional stamps for the entire batch. This information allows the BMC to reconstruct an exact image of the batch of negatives, and also reconstruct the encoding of the identification numbers on the corresponding print paper.

3. Detects the splice.

The tachometer assembly further typically comprises a splice sensor for detecting the presence of a splice (used to couple the films of different orders together) passing through the tachometer assembly.

When a splice is detected, the current tachometer count is typically transmitted to the BMC (see above). The printer interface attachment uses the count to determine when to enable the bar code reader. When the splice arrives at the bar code reader, the bar coded splice identification number is then read by the bar code reader and sent to the BMC along with the current tachometer count.

When the batch has ended, the BMC will process the batch file and generate a record for each order comprising the splice number, the number of prints exposed, and the identification number encoded onto the prints.

The records will be accessed by the packaging station to insure correct matching of prints and negatives during packaging of the orders.

As discussed earlier, since two splices can be situated between where the splice number is read and where the negatives are exposed, mixes can occur between the splice number read and the number encoded on the paper. The counts provided by the tachometer help prevent this problem by providing verification that the specific splice read at the bar code splice reader is the same as the order of negatives being printed.

Turning now to FIGS. 15*a*–15*d*, the detailed operation of the tachometer will now be described.

Figure 15B:
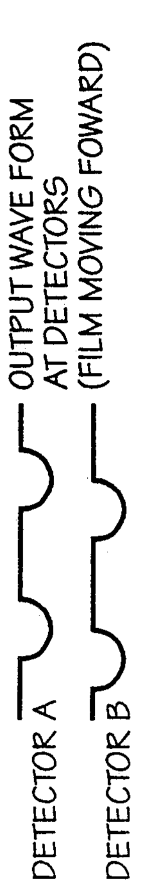
FIGS. 15*a*–15*d* illustrate the tachometer of the subject invention.
Figure 15C:
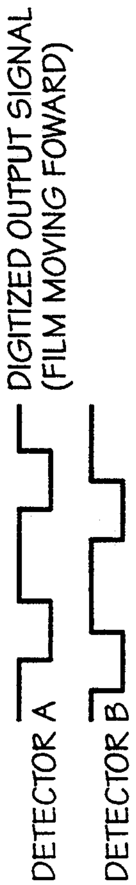
Figure 15D:
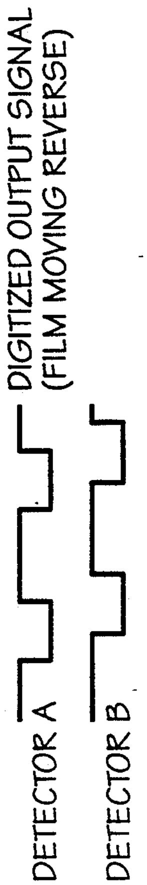
Figure 15A:
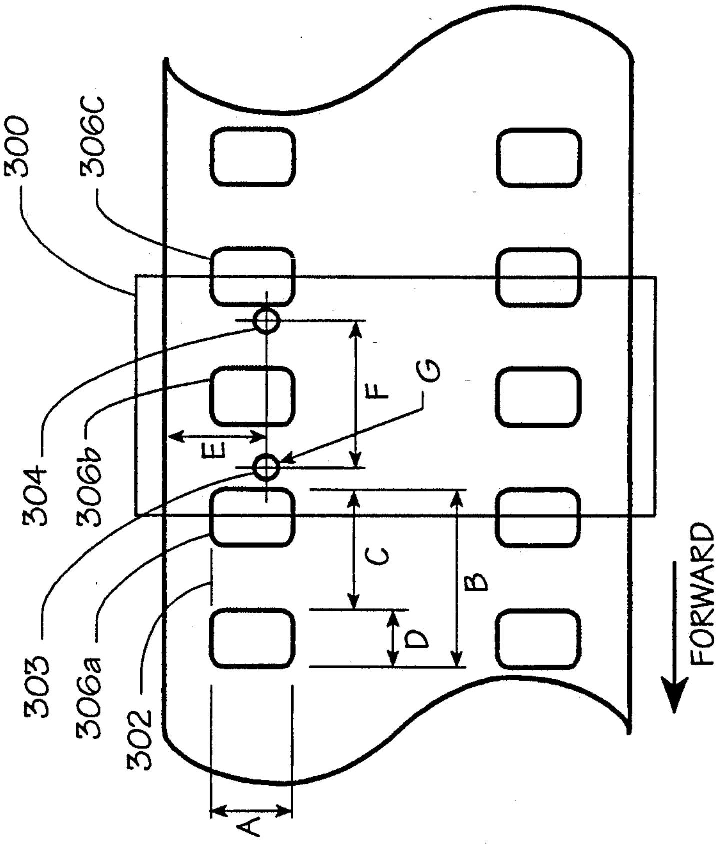

FIG. 15*a* illustrates tachometer assembly 300 and film 302. As shown, the film typically has sprocket hole 306*a*, 306*b*, and 306*c*, situated along the first and second edges of the film.

The tachometer assembly comprises two infrared detectors 303 and 304 as shown which will be referred to subsequently as detector A and B, respectively, positioned along the edge of the film as shown. (The tachometer assembly may also comprise other detectors or sensors as discussed earlier but not shown in FIG. 15*a*).

The placement of these detectors is important for determining the direction of film movement. As the film moves by these detectors, there will be a point where both detectors are blocked simultaneously by the film (in fact, this point is shown in FIG. 15*a*, where both detectors are shown blocked simultaneously). Each detector produces an output signal which, in the specific example illustrated, is assumed to be in the high state when blocked.

As the film continues to move by the detectors, one detector will go clear while the other will remain blocked.

As the film continues to move by the detectors, each detector will produce a signal modulated by the sprocket holes passing their view.

FIG. 15*b* shows the output waveform from the detectors while the film is moving in the forward direction (indicated in FIG. 15*a*).

The modulated signals are fed into digitizing circuitry that digitizes the signals, and produces a digitized waveform that more precisely depicts the transitions caused by movement of the sprocket holes of the film.

FIG. 15*c* illustrates the digitized waveforms produced by the film moving in the forward direction, while FIG. 15*d* illustrates the digitized waveforms produced by the film moving in the reverse direction.

The relationship between the two digitized waveforms is used to determine the incremental movement and direction of the film in the printer.

An algorithm is provided to determine the film direction as follows:

1. The condition where both detectors A and B are blocked by the film (causing both waveforms to be in the high state) is first detected.

2. Film movement then causes one of the waveforms to enter into a low transition.

3. If the detector A waveform changes state before the detector B waveform, then the film is detected to be moving in the reverse direction.

4. If the detector B waveform changes state before the detector A waveform, then the film is detected to be moving in the forward direction.

The above describes detecting the direction of film movement. With respect to counting the number of sprocket holes passing each detector, this value can simply be determined by counting the number of negative-transition pulses which are modulated into the respective waveform.

Advantageous dimensional specifications for the tachometer assembly will now be described, although other examples are possible, and these specifications are not meant to be limiting. It should be noted that the specifications for the assembly are, in part, dictated by the dimensions of the film. Therefore, changes in the film dimensions will cause corresponding changes in the assembly. The specific dimensions for the example of FIG. 15*a* are as follows:

| DIMENSION | VALUE |
|---|---|
| A | 0.110 in. |
| B | 0.265 in. |
| C | 0.187 in. |
| D | 0.078 in. |
| E | 0.142 in. |
| F | 0.234 in. |
| G | 0.046 in. diameter |

Figure 16A:
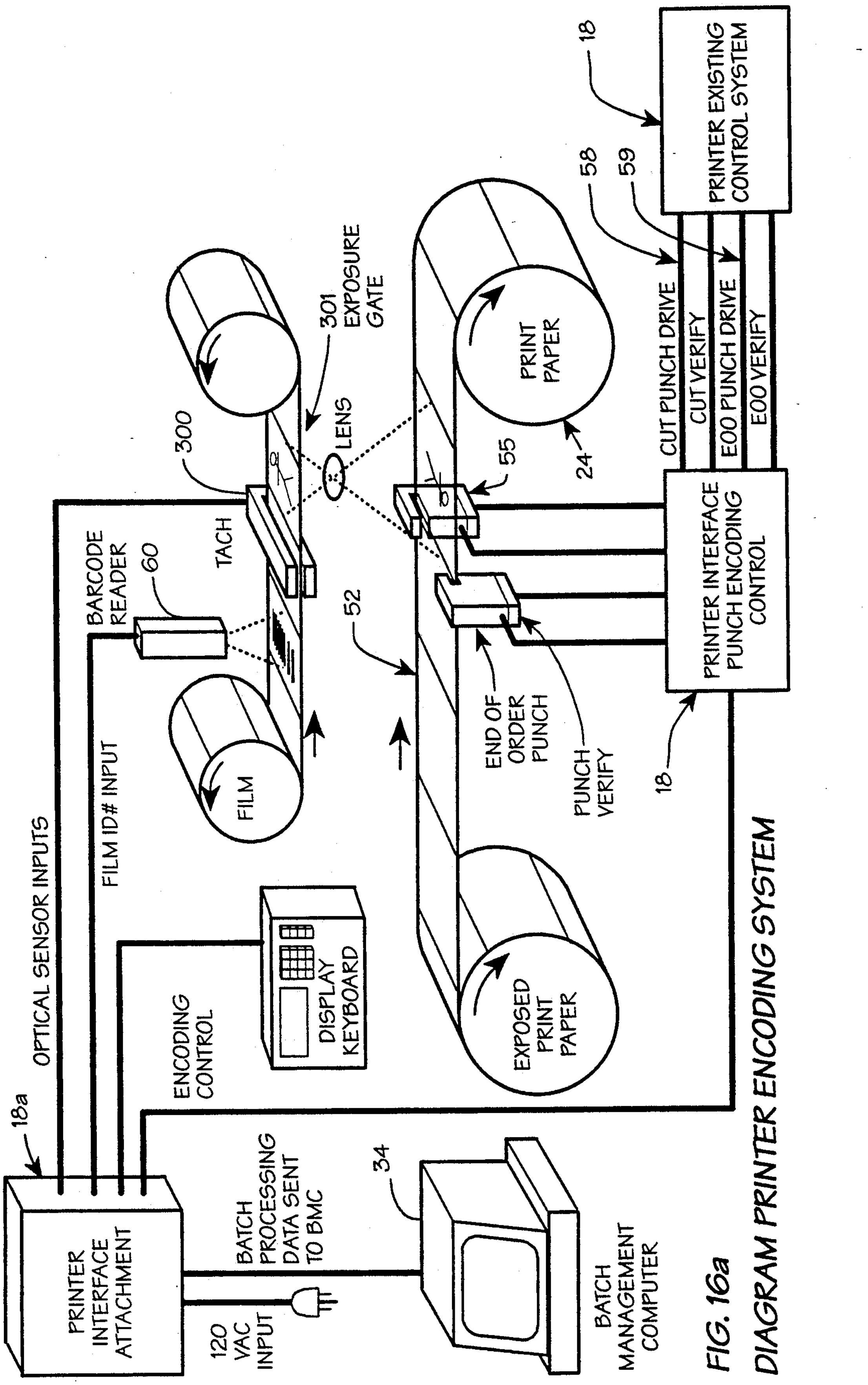
FIGS. 16*a* and 16*b* illustrate in detail two embodiments of the subject invention.

A more detailed illustration of a first embodiment of the subject invention is provided in FIG. 16*a*, in which like elements have been referred to with like reference numerals introduced in earlier figures.

A key aspect of this embodiment is the placement of bar code reader 60 downstream in the processing sequence from printer exposure gate area 301. As shown, the tachometer assembly 300 is advantageously situated between the printer exposure gate and the bar code reader. Moreover, in addition to the motion and direction detectors, the tachometer assembly includes a splice detector.

This embodiment operates as follows. First, the presence of splice 308 triggers an end-of-order firing, and the beginning of the exposure of prints for a new order. In accordance with the invention, an identification number is generated (either by the BMC 34 or the printer attachment 18*a*) and then encoded onto the prints by mean of the punch encoding control means 62 of the printer interface, the printer's existing control systems 18, and punches 54 and 55, in accordance with the teachings of the '061 patent, and with CIP application Ser. No. 279,463.

Next, the film splice passes through the tachometer assembly. The splice detector detects the presence of the splice, and then enables the bar code reader. In addition, the direction and motion detectors track the movement of the film splice to ensure that the splice bar code read from the splice will be matched with the correct identification number encoded onto the prints in accordance with the teachings of the subject invention.

The splice bar code is then read, paired with the correct identification number, and the pairing stored for later use by the packager 20. The packager will decode the encoded identification number off of the prints, decode the bar coded number off of the corresponding splice, and use the pairing stored on the BMC to associate the prints with the corresponding splice.

Figure 16B:
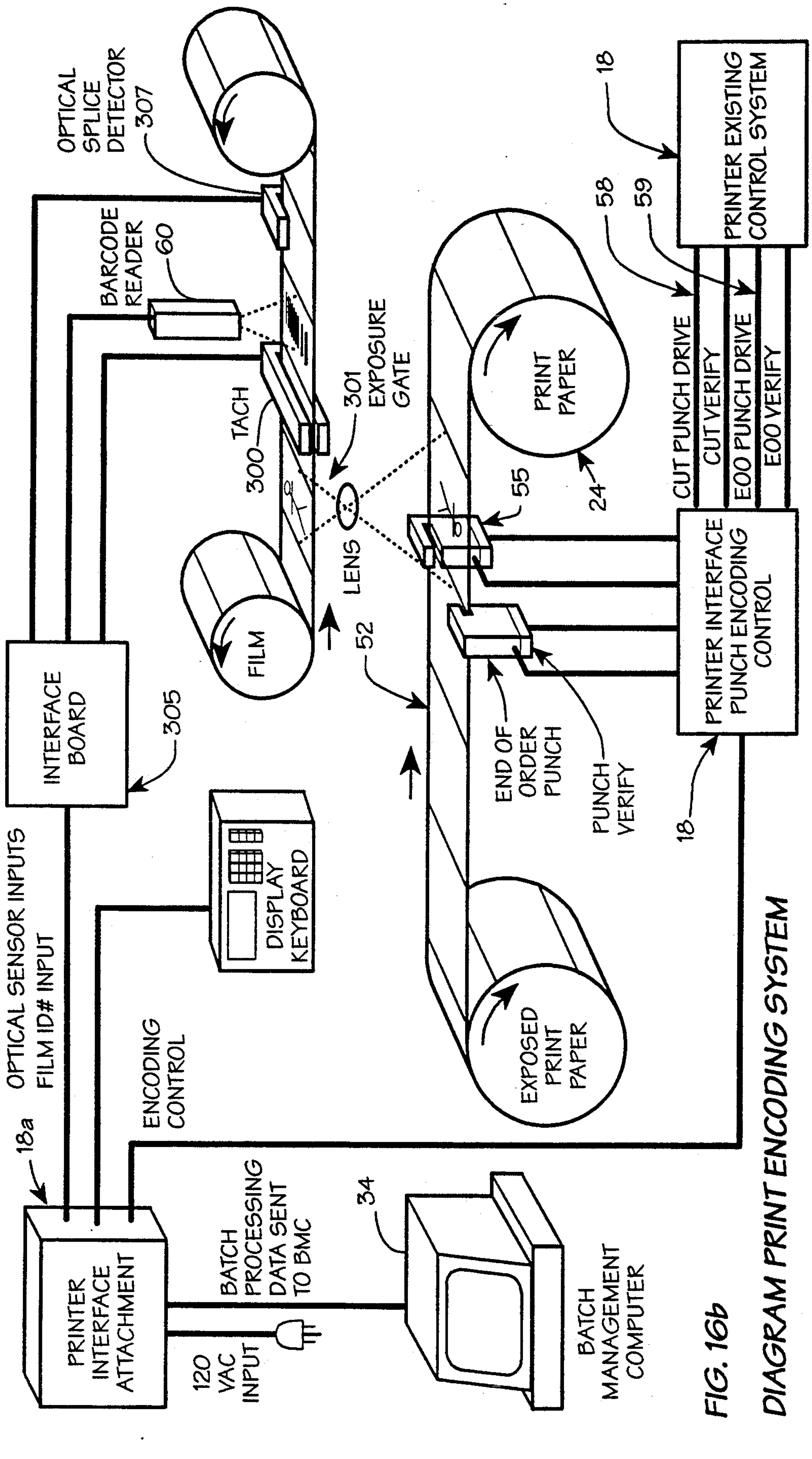

A second embodiment of the subject invention is illustrated in FIG. 16*b*, in which like elements are referred to with like reference numerals. A key aspect of this embodiment is the placement of the bar code reader 60 upstream in the processing sequence from the printer exposure gate 301. As shown, the tachometer assembly 300 is situated between the bar code reader and the printer exposure gate to track the movement of the film between the bar code reader and the exposure gate. As shown, a separate splice detector 307 is provided (not combined with the tachometer assembly 300) to detect the presence of a splice. Also provided is interface board 305 for interfacing the bar code reader, the splice detector, and the tachometer assembly to each other and to the printer attachment 18*a*. The splice detector is separated out 80 that it can be situated upstream from the bar code reader, for use in detecting the presence of a splice, and enabling the bar code reader. If the splice detector were to be combined with the tachometer assembly, it would not be able to perform this function.

The operation of this embodiment is as follows: After splice detector 307 detects the presence of splice 308, the bar code reader is enabled and subsequently reads the bar coded number off of the splice. Next, the film passes through the tachometer assembly, which tracks the movement of the film to the exposure gate 301 in accordance with the teachings of the subject invention. When the splice arrives at the exposure gate, an end-of-order condition is sensed, the BMC is signalled to generate an identification number for the prints, and this identification number is then encoded onto the prints according to the teachings of the '061 patent.

The BMC then pairs the bar coded value with the identification number encoded onto the prints and stores this pairing for use later by the packager in matching the prints with the films.

For the sake of completeness, other aspects of the automated photofinishing system, which aspects are also described in the '061 patent, will be described in the remainder of this specification.

An additional cross-check between the prints and the other parts of the package, namely the splice on the film and the order bag, can be made by making use of the information received and filed by the batch management computer 34. This computer retains in its memory the number of prints that were made by the printer 18 for each film. Therefore, as another cross-check, one can check to determine if the correct number of prints have been seen at the packaging machine 20 for each respective film.

Figure 6A:
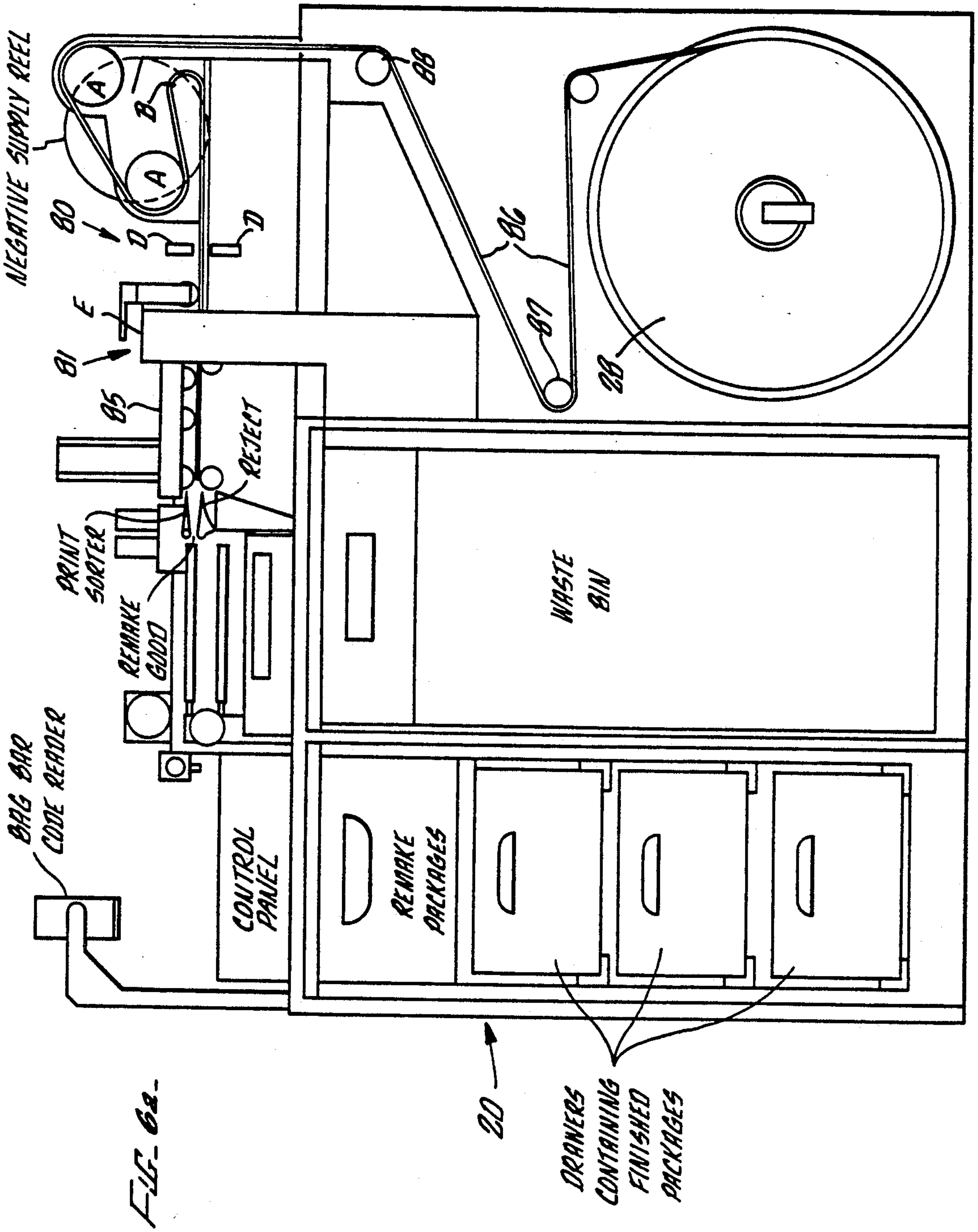
FIG. 6*a* is a front elevation view of a packaging console, principally illustrating the print handling and cutting system of the invention described in the '061 patent.

According to another aspect of the invention described in the '061 patent, and as noted earlier, print cutting of the individual prints from the final print roll 28 (FIG. 1*b*) can be accomplished by causing the knife mechanism to run continuously and by starting and stopping the print paper. This part of the packaging machine is shown in greater detail in FIGS. 6 and 7. FIG. 6*a* shows a simplified front elevation view of the packaging machine 20, and it along with FIGS. 7*a*–7*d* illustrate details of the print supply system from the final exposed print roll 28 to a paper and hole sensor 80 and cutting mechanism 81. The typical knife system 81 (81 and "E" in FIGS. 6*a* and 7*a*) which is used to cut prints from a print roll is a punch and die type system that removes a small slug of print paper approximately 0.1" wide between successive prints as it cuts them apart. The knife is shown generally at 81 in FIG. 6*a*, and is shown in greater detail in FIGS. 7*a*–7*b* which illustrate knife dies 82 and 83 and a knife punch 84. The typical knife in the usual print cutter has a relatively high mass and is started and stopped once per each print cut usually via a clutch system. The clutches wear out frequently and the start and stop movement of the high mass knife slows down the cutting operation. The present system allows for smooth continuous motion of the cutting system.

According to the invention described in the '061 patent, the knife 81 runs continuously. During the time the knife blades (84 and 82–83) are opened, the print paper 86 is rapidly accelerated by a stepping motor 87, the cut mark (punch hole) in the print paper is detected, and this mark is positioned under the knife blade 84 before it comes down again. This allows the cutting system to cycle at very high speed and eliminates the need to start and stop the knife for each print cut. A clutch 88 (FIG. 7*b*) preferably is provided in the knife drive system (e.g., on a shaft 96) to allow the knife to be stopped in the event there is no cut mark on the print paper as a result of a punch failure in the printer, and to allow for stopping the knife in a controlled position.

Figure 7B:
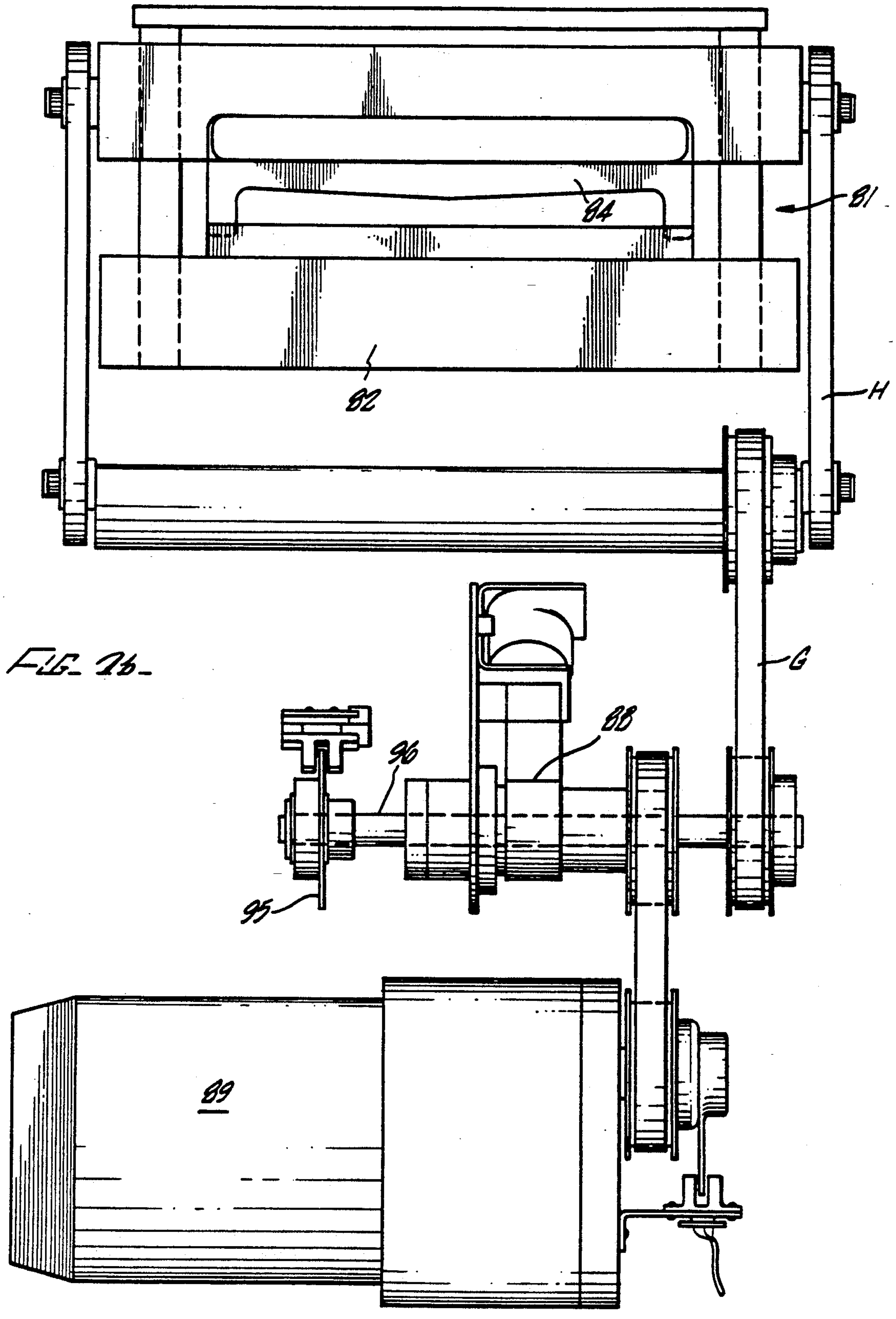
Figure 12:
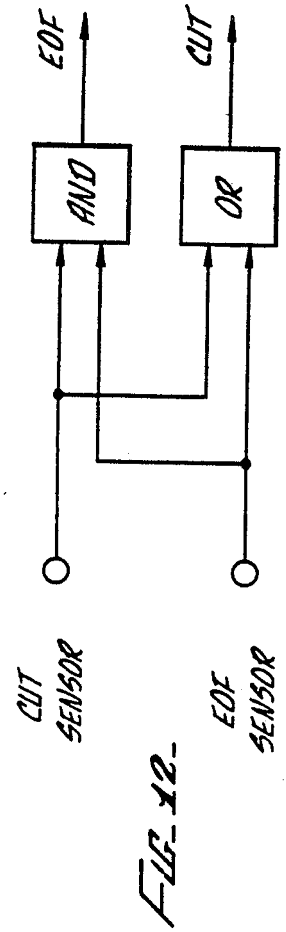
Figure 7D:
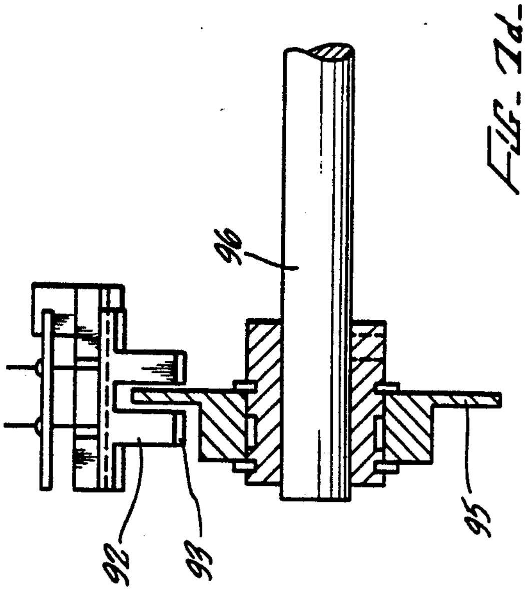
FIGS. 7*c* and 7*d* illustrate side and front views of a timing wheel for the cutting system of FIGS. 7*a*–7*b*.
Figure 7C:
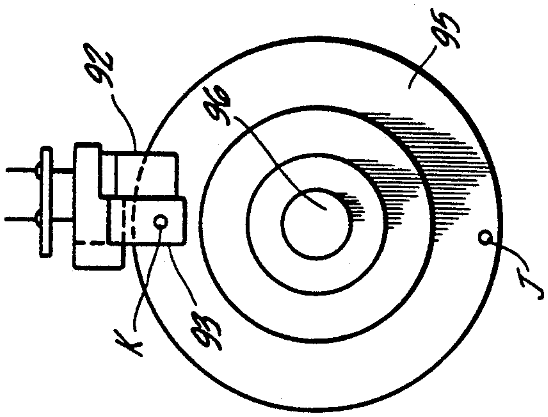

FIG. 6*a* illustrates the print supply roll 28 and the roll of prints 86 which moves around a dancer roll 87, idler 88, and continuously running rollers A. The rollers A run continuously to produce a slack loop B. The print web 86 advances past optical paper hole sensor D (which senses the presence or absence of the print paper) of the sensor 80, between a drive roller C (note FIG. 7*a*) and a spring loaded pressure roller 94, and past the punch hole sensors M. The roller C is driven by a stepping motor 87 to feed the print paper 86 and the cut mark (punched hole) from the optical hole sensors M to the knife E (FIGS. 7*a*–7*b*) The knife E is driven from a motor 89 via a clutch 88 and belt drive system G and link H (FIG. 7*b*). A timing wheel 95 (FIGS. 7*b*–7*d*) is provided on a shaft 96 driven by the motor 89 and can provide a synchronizing pulse to the knife and paper drive system so that the feed roller C can begin to feed the next print, and provides another pulse that indicates the "last chance" to stop the knife E before cutting the print roll. The timing wheel 95 includes holes J and K (note FIG. 7*c*) for this purpose and these holes are sensed by sensors 92 and 93.

The basic cycle is as follows:

A. A timing mark J on the knife drive indicates that the knife E is open.

B. The stepper motor 87 driving the roller C ramps up to full speed, thereby driving the print paper 86.

C. Optical sensors M detect the punch hole in the edge of the print paper 86.

D. The paper feed is measured by an encoder on the stepper motor 87 that tells the control system how far the paper 86 has been driven as it is fed toward the knife 81. At the time the stepper motor 87 begins to ramp up, the control takes the maximum number of steps remaining, i.e. the maximum time remaining, to position the longest possible feed under the knife 81 before it begins to close (cut) and begins to subtract steps that are made.

E. As the print paper is being fed, the photo optic sensor M looks for a punch hole in the print paper. This will determine the remaining number of steps to be made to position the hole exactly under the knife blade 84 since the distance M to the knife blade is a fixed distance.

F. The stepper motor then ramps down and positions the hole at the knife and the knife cuts the paper, then the cycle will continue. The foregoing represents a normal cycle.

The sensor M and the stepper motor 87 thus provide the ability to make a "last minute" change in the positioning of the print paper and punch hole by the stepper motor and roller C.

If, at the time the "last chance" timing mark K of the knife has been seen there are too many steps remaining to position the hole before the knife closes, the knife will be stopped. Stated differently, when the machine starts feeding the paper toward the cutter, the system starts counting the steps still to go and when the hole is finally seen at M, if there is not enough time to get the cut hole in the paper to the knife in the remaining time, the knife is stopped. A likely cause of this condition can be a bind in the paper or something that held it back during the time the paper started to advance the hole up to the sensor M.

If no punch hole has been detected by sensor M in the distance one should have been detected based on the system's averaging from memory several previous print feed increments, the decision can optionally be made to stop the knife or to cut at the interval where the hole should have been. As the machine is running along performing its normal cycle, it keeps track of how far it fed each of the last eight prints and it averages them all together so that as the cycle runs along and a hole is not detected at M where one should have existed based on the average, a cut will be made anyway because it may have been that the printer punches inadvertently failed to make a punch hole. Therefore, it is safe for the most part to make the cut in this case. The system is user selectible so that it can either do a blind cut as explained above or stop the cut, or even cut a number of times between successive prints and then later stop if it has not seen a punch mark after several prints. Thus, one or several punch marks can be missing and the cuts still be made as usual. The control program or system can thus provide the option to cut or not as chosen by the operator and, in addition, the number of blind cuts acceptable can be user selectible.

Turning again to the sensor D, it is a print paper sensor and is used to insure that the last piece of the end of a print roll is not cut any shorter than the minimum length required to pass through the sorting unit of the packaging machine following the knife 81. An accelerator 85 following the knife takes the cut prints and sends them through the sorting section of the machine as seen in FIG. 6*a*. When the very end of a roll of paper is approached, it should not be randomly cut and end up with a little paper sliver that can jam the mechanism. Thus, when sensor D sees light (there is no more paper) the machine makes a cut no matter what so that the last piece of paper will have a length as long a it is from D to the knife 81 and this is long enough to make it through the sorting mechanism and down into the trash without jamming the mechanism.

Figure 6B:
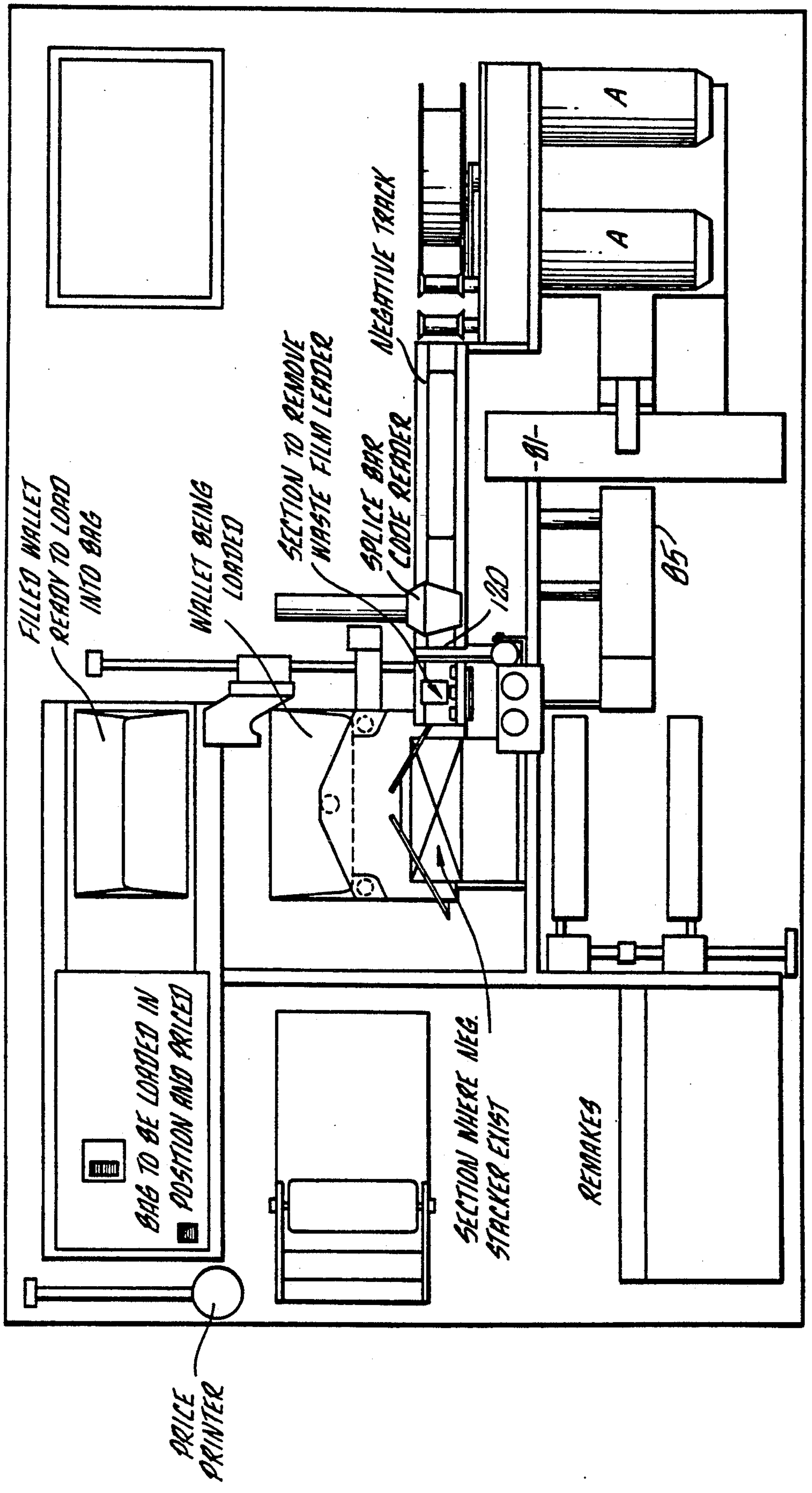
FIG. 6*b* is a top view of the packaging console of FIG. 6*a* and particularly illustrates film handling and cutting.

FIG. 6*a* generally illustrates other components of the packaging machine 20 as labelled. FIG. 6*b* is a top or plan view of the machine illustrating toward the bottom of FIG. 6*b* the components of the print cutting and sorting system described above, but more particularly, illustrates the film negative handling and packaging by the packaging machine 20.

Figure 8A:
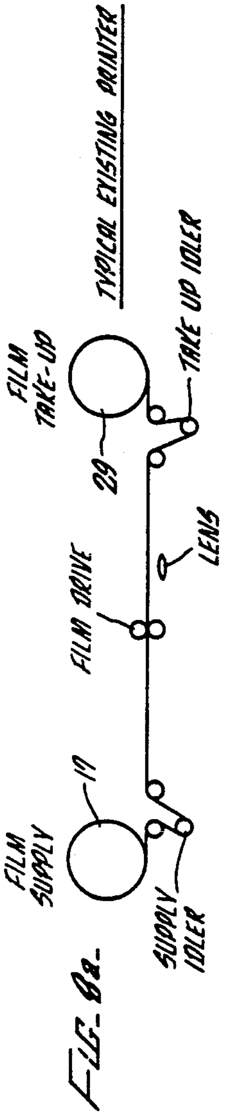
FIG. 8*a* illustrates a typical prior art film advance system.
Figure 8B:
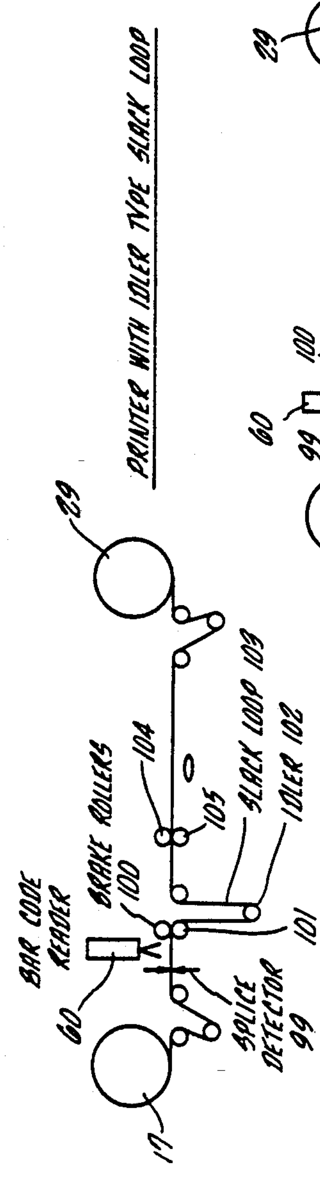
FIGS. 8*b* and 8*c* illustrate film advance systems for a printer according to the invention described in the '061 patent.

Turning now to FIG. 8, FIG. 8*a* illustrates a prior art film drive and advance system for moving the film in the printer 18 from the film supply 17 to the film take-up 29 during the process of exposing the film negatives onto the print paper. As is known, the film moves in a somewhat irregular jerking motion as each film frame is stopped for its exposure onto the print paper, and then is advanced to the next film frame which may be an irregular distance from the previous frame. Because of this motion, it is difficult to accurately detect a code on the film splice. A further concept of the present invention is to make it possible to stop the bar coded splice under the field of view of the bar code reader 60 during the printing operation so as to insure that the bar code is correctly read and to enable a relatively inexpensive bar code reader to be used in the system. The splice and bar code thus are detected and read at the time the bar code is in the field of view of the bar code reader 60. This can be accomplished photo-optically since the splice has a higher optical density than the darkest possible part of the film. When the splice is detected at 99, a brake can be applied to a pair of brake rollers 100–101 which the film passes between. This causes the film to stop and keeps from moving the splice bar code during the time the bar code reader 60 reads the bar code.

As will be apparent to those skilled in the art, the usual mechanism of the printer will still be trying to pull the film through the brake rollers 100–101. This problem is solved by adding an idler 102 to provide a slack loop 103 between the braking rollers 100–101 and the film drive rollers 104–105 of the usual printer mechanism. During the short time the brake rollers 100–101 are activated to stop the film, the idler 102 rises as the slack loop 103 is taken up. When the bar code has been read by the reader 60, the brake rollers can be released, and the idler 102 will fall back to the bottom of its travel (to the position shown in FIG. 8*b*). In the event that the bar code reader 60 cannot read the bar code by the time the slack loop 103 has been used up, the fact that the idler is approaching the top of its travel can be sensed and the brake released. In this case, an error number or code can be supplied to the printer to be encoded on the prints to indicate to the subsequent processing equipment that the bar code was not read or was unreadable.

Figure 8C:
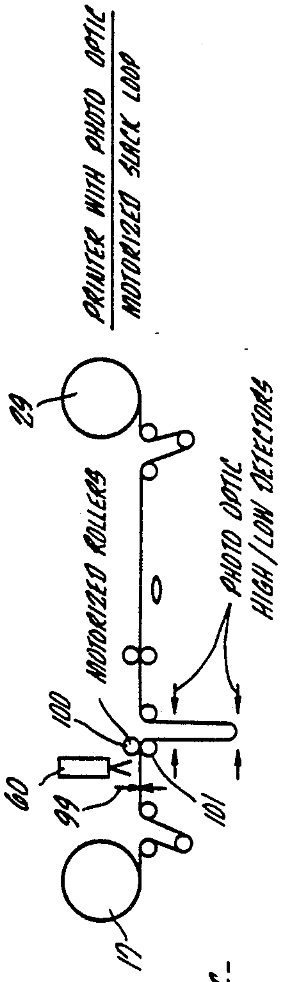

In some printers, the weight of the added idler 102 may be too much and may interfere with the printer film drive. As an alternate, the brake rollers 100–101 can be motorized as indicated in FIG. 8*c* to feed the film into a slack loop 107 which can be sensed at its extreme ends (top and bottom) by suitable photo-optic sensors.

Figure 9:
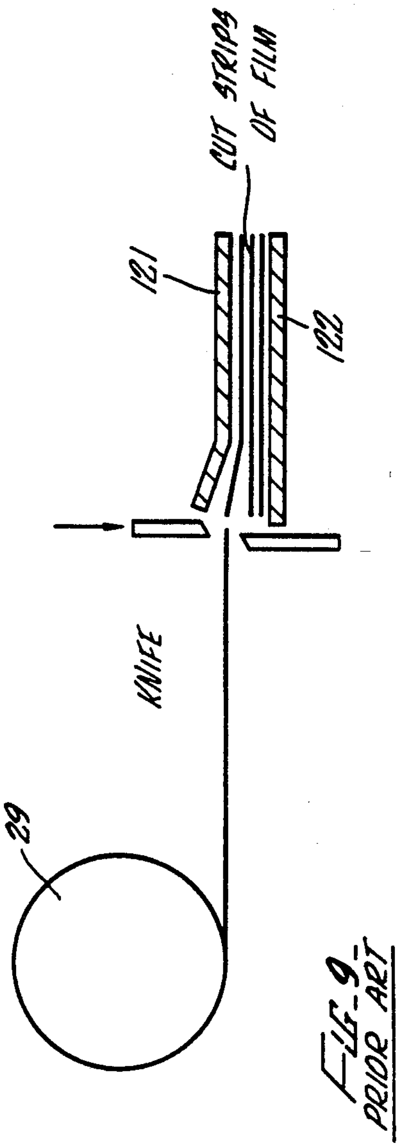
FIG. 9 PRIOR ART
FIG. 9 illustrates a typical prior art cut film strip accumulator.

Another concept according to the invention described in the '061 patent involves a new form of film accumulator for obviating problems occasioned in prior systems. FIG. 9 is an illustration of a prior system for cutting, catching and stacking cut strips of the printed film. The roll of film 29 advances to a knife 120 which cuts the film into pieces, typically four frames, which are then received by a catcher 121 and a tray 122. As is known, when the knife 120 completes its cut, a cut piece of film falls to rest in the tray 122, usually under a light holding force that holds the cut piece down below the plane of the next piece of film to be fed and cut. When the next film piece is fed, it is forced to slide on top of the previously accumulated piece, as illustrated in FIG. 9. This can cause scratches to occur because of rubbing together of the film sections. Another problem that occurs is that the raw cut edge may snag in the perforation holes of the previously cut film piece, thereby causing dislocation of the stack. This is not a problem in a manual system where the operator realigns the stack manually before inserting it into the paper wallet, but can present problems in an automated system and is not an acceptable way of accumulating a film stack.

Figure 10B:
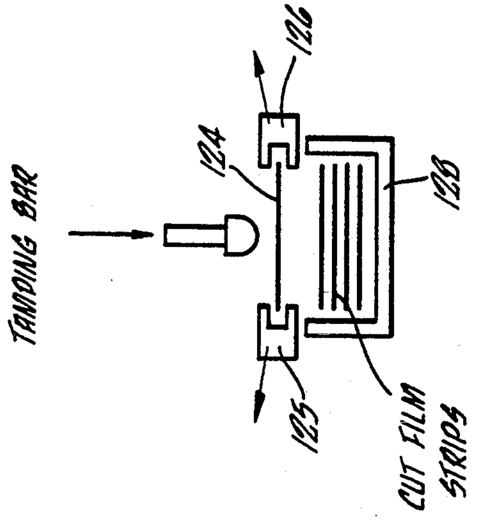
FIG. 10*a* is a side view and FIG. 10*b* is an end view of a film accumulating system according to the invention described in the '061 patent.
Figure 10A:
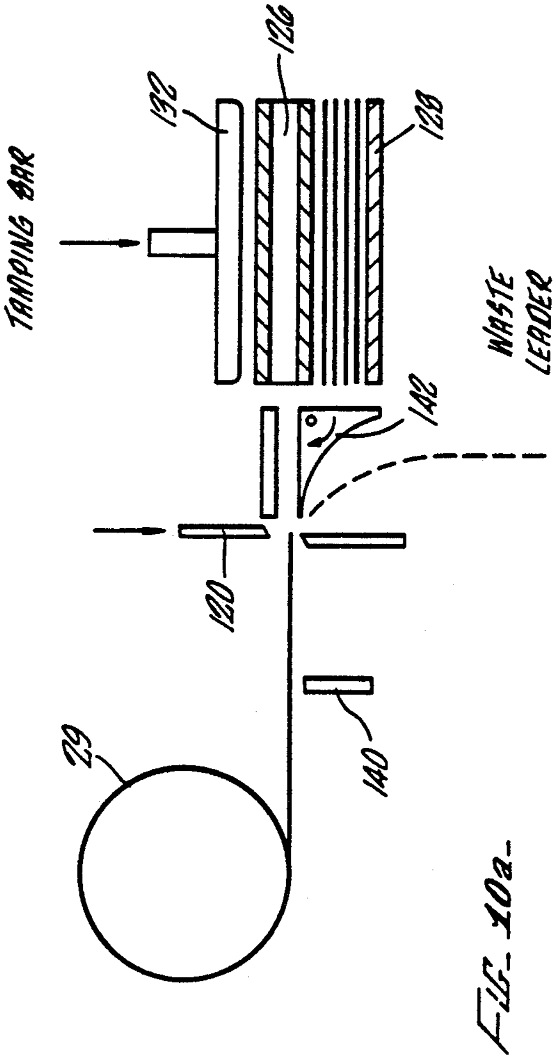

An exemplary embodiment of an improved form of film accumulator is illustrated in FIGS. 10*a*–10*b* and in FIG. 11. A film section 124 is cut into the usual piece by the knife 120, and fed into a short section of track long enough to accommodate its length. This track is formed of a pair of edge guides 125–126 that support the film by its edges only. A catch bin 125 is provided slightly below the track 125–126 to accumulate the sections of cut film. The two edge guides 125–126 pivot apart as shown in FIGS. 10*b* and 11, thereby allowing the section of film 124 to pass down between the tracks 125–126 into the bin 125. The tracks or edge guides 125–126 can pivot on respective pivots 129–130 as seen in FIG. 11. A soft surfaced tamping bar 132 is arranged above the plane of the film section 124 in the track. This bar pushes the film 124 down into the stack when the edge guides 125–126 pivot apart, and hold the film section 124 there until these edge guides are brought back together, after which the tamping bar 132 retracts to allow the next piece of film to be fed into the edge guides. By using this technique, a stack can be produced by virtual stacking without producing any relative motion between the pieces or sections of film in the stack.

Additionally, a further improvement over existing film cutting systems is provided and in which sections of threading leader that are sometimes inserted in between films or batches of films on a given roll can be automatically detected and removed. This facilitates automating the packaging system and in present systems the threading leader is manually removed by the operator at the time of packaging. This is accomplished by providing a leader detector 140 (note FIG. 10*a*) which optically reads the density difference between films and the leader. When a leader is detected, a diverter 142, after the knife 120 and prior to the track 125–126, pivots or opens to send the leader to waste. When the film is again detected, the knife 120 trims the leader off the end of the film, and the diverter 142 returns again to its initial position shown in FIG. 10*a* allowing film pieces 124 to move through to the track 125–126.

As noted earlier, the batch management computer 34 (FIG. 1*a*) maintains files relating batch numbers to bag numbers and splice numbers. It receives inputs particularly from the splicer 12, printer 18 and packaging machine 20, but can receive inputs from other sources in the system (such as the paper wallet collator 36). Its tasks include the following: The computer 34 maintains files on each batch which relate the order bag identification number, which is the combination of its (1) bag number, (2) dealer number, and (3) position and the sequence of the batch, to the bar coded splice number that is applied to the film roll. This information regarding bag numbers and film numbers can be communicated to the packaging machine 20 thereby making it possible to check if the correct films are going into the correct order bags.

The batch management computer 34 also communicates to the printer the number of prints to be made from each negative frame on a given roll of film (note FIG. 3). This eliminates the requirement of prior art systems for sorting the "one each" and "two each" orders prior to film splicing and eliminates the requirement of grouping together only "one each" into one roll of like films or "two each" into one roll of like films. This can be accomplished by having the operator of the splicer 12 look at each order bag 11 to see if it has been marked "one each" or "two each". If the quantity is not what is being spliced in majority into the film batch, the operator can depress a key indicating to the splicer 12 that that film will be, for example, "two each." The splicer 12 provides an indication of this "two each" requirement to the computer 34 along with the other information about the film for the computer to keep track of. Later in the processing, when the developed films are sent to the printer 18, the splice bar code can be read and correlated with the print encoding discussed earlier to determine how many prints per frame are to be made. This information can be fed to the printer to cause it to make the corresponding number of prints.

In addition to the foregoing functions, the computer 34 can provide the paper wallet collator 36 with information needed to produce a stack 35 of various paper Wallets that match the various dealers' bags in a given batch. In addition, the computer can inform the collator which bags will need two paper wallets (to accommodate larger print orders) or which will need one wallet. The computer also can be used to generate reports or respond to inquiries regarding the log-in, log-out or work-in-process status of any batch or individual order based on inputs from the splicer 12, printer 18, packaging machine 20 and other stations in the photo finishing lab where data can be collected.

Figure 12:
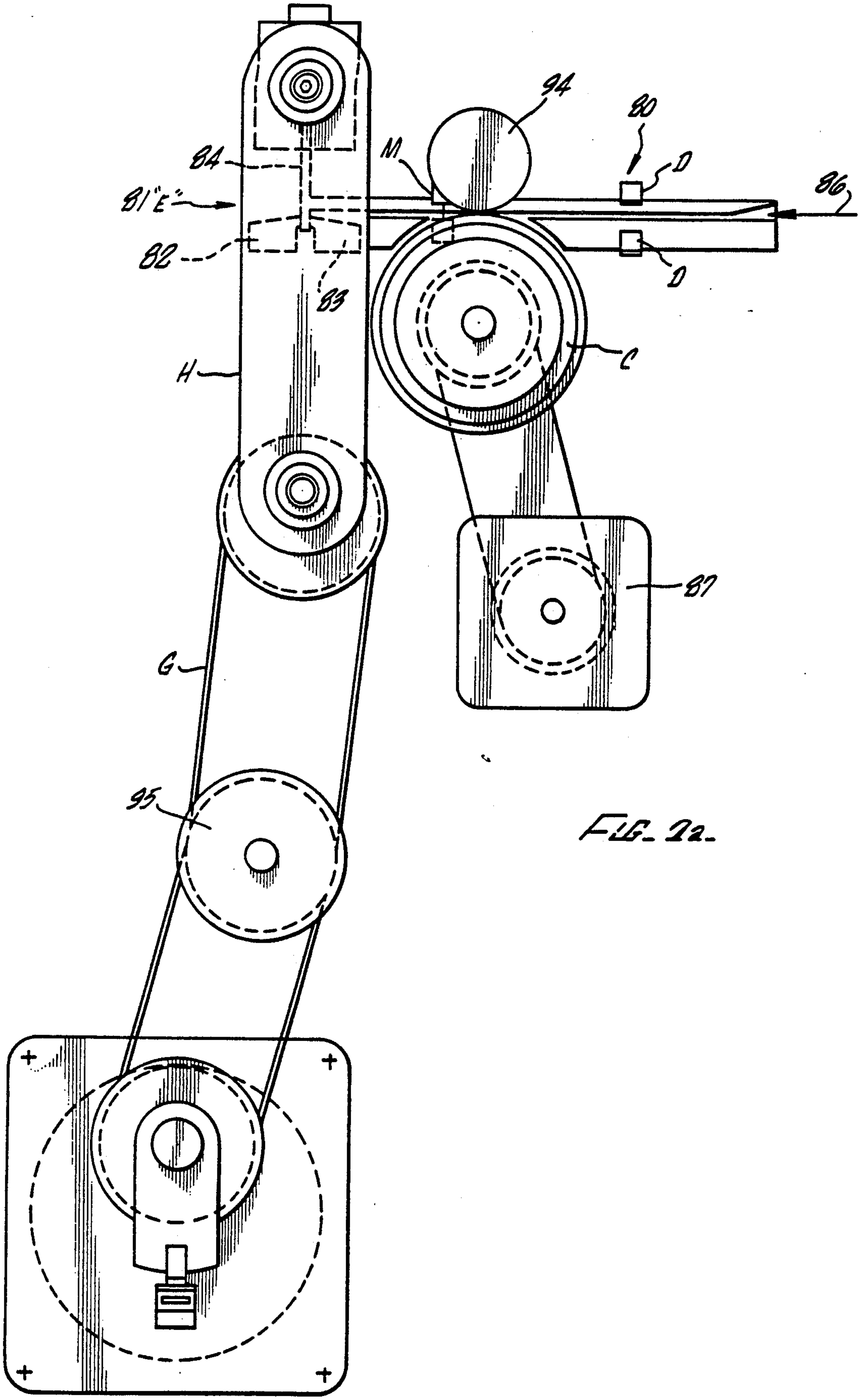
FIG. 12 is an alternative print punch sensor system.

FIG. 12 shows a block diagram of a logic circuit for use with existing print cutters having the usual dedicated cut punch sensor and end of order punch sensor for each edge of the paper. This adapter makes it possible to run print paper that has been punch encoded according to the present invention on such existing print cutters. Such prior type of cutters have two separate inputs, one that indicates cut each and every time it sees a hole (to cut apart prints) and the other that indicates end of order each and every time it sees a hole. The sensors of such prior machines would be confused by the apparent random locations of the punch holes in the paper that have been encoded according to the present invention. The logic circuit of FIG. 12 can be connected between the print paper punch hole sensors of existing cutters and their cut punch and end of order punch hole sensor inputs. The logic circuit simply comprises an AND gate and an OR gate, with both cut sensor inputs which sense the cut punch holes from the print paper and the end of order sensor being connected to both the AND gate and the OR gate. The output of the AND gate provides an end of order signal to the end of order punch hole sensor input of the existing prior art cutter, and the output of the OR gate provides a cut signal to the cut punch hole sensor input thereof. This circuit provides an output to the prior cutter's cut punch input any time one hole is seen on either side of the paper, and provides an output to the prior cutter's end of order input any time a hole is seen on both sides of the paper simultaneously, thereby making the presently encoded print paper appear the same as the print paper previously used in such prior systems.

It will be apparent to those skilled in the art that various improvements in photo processing techniques and labs have been shown and described. Modifications and variations can be made without departing from the spirit of the concepts of the present invention, and such variations, modifications and equivalents are intended to be encompassed within the scope of the appended claims.

What is claimed is:

1. A method for packaging prints with a corresponding film comprising:

reading first identification indicia from a film;

generating second identification indicia;

encoding the second identification indicia onto corresponding prints, the prints being in a print roll having first and second edges, and boundaries between successive prints, by selectively making notches in either the first or second edges of the print roll at the boundaries between successive prints in accordance with said second identification indicia;

forming a pairing between the first and second identification indicia;

storing the pairing; and packaging the prints with the corresponding film using said pairing.

2. The method of claim 1 wherein said first identification indicia is different from said second identification indicia.

3. The method of claim 1 wherein the second identification indicia is a predetermined value if the first identification indicia was unreadable from the film.

4. The method of claim 1 wherein the second identification indicia is a randomly generated number.

5. The method of claim 1 wherein the second identification indicia is a sequentially generated number.

6. The method of claim 1 wherein the generating step takes place before the reading step.

7. The method of claim 1 wherein the reading step takes place before the generating step.

8. A photofinishing packaging apparatus comprising:

a decoder for decoding first identification indicia from a film;

control means for generating second identification indicia;

an encoder coupled to the control means for encoding the second identification indicia onto prints corresponding to the film, the prints being of in a print roll having first and second edges, and having boundaries between successive prints, wherein the encoder is adapted to selectively make notches in either the first or the second edges of the print roll at the boundaries between successive prints in accordance with said second identification indicia;

wherein the control means is further coupled to the encoder and to the decoder and is adapted to receive and form a pairing between said first and second identification indicia and store the pairing; and a packager coupled to the control means for accessing the pairing and matching the film with the corresponding prints using said pairing.

9. The apparatus of claim 8 wherein the control means is adapted to generate said second identification indicia which is different from said first identification indicia.

10. The apparatus of claim 8 wherein the control means is adapted to generate said second identification indicia which is a predetermined value if said first identification indicia is undecodable by said decoder.

11. The apparatus of claim 8 wherein the control means is adapted to generate said second identification indicia randomly.

12. The apparatus of claim 8 wherein the control means is adapted to generate said second identification indicia sequentially.

13. The apparatus of claim 8 further comprising means for moving the film along a predetermined path between the decoder and the encoder in a direction of film travel.

14. The apparatus of claim 13 wherein the encoder is situated after the decoder along the path in the direction of film travel.

15. The apparatus of claim 13 wherein the encoder is situated before the decoder along the path opposite to the direction of film travel.

16. The apparatus of claim 13 further comprising a tachometer situated along the path between the encoder and the decoder, and coupled to the control means for detecting the direction of film travel, and communicating the detected direction to the control means.

17. The apparatus of claim 16 wherein the film has an edge with sprocket holes along the edge, and the tachometer is adapted to count at least some of the sprocket holes along the edge of film moved past the tachometer, and to communicate the detected count to the control means.

* * * * *